(12) United States Patent
Breyfogle, III et al.

(10) Patent No.: US 11,640,161 B2
(45) Date of Patent: May 2, 2023

(54) SYSTEMS AND METHODS FOR MEASURING AND REPORTING ENTERPRISE PERFORMANCE AND MAKING PROCESS IMPROVEMENTS

(71) Applicant: SMARTER SOLUTIONS, INC., Austin, TX (US)

(72) Inventors: Forrest W. Breyfogle, III, Austin, TX (US); Tran Nam Chinh, Ho Chi Minh (VN); Pham Minh Tri, Ho Chi Minh (VN); Stanley Douglas Wheeler, Cypress, TN (US); Frederick Haynes, West Mifflin, PA (US)

(73) Assignee: SMARTER SOLUTIONS, INC., Austin, TX (US)

( * ) Notice: Subject to any disclaimer, the term of this patent is extended or adjusted under 35 U.S.C. 154(b) by 0 days.

(21) Appl. No.: 17/190,672

(22) Filed: Mar. 3, 2021

(65) Prior Publication Data
US 2021/0200197 A1    Jul. 1, 2021

Related U.S. Application Data

(63) Continuation of application No. 15/216,467, filed on Jul. 21, 2016, now abandoned.
(Continued)

(51) Int. Cl.
*G05B 23/02*    (2006.01)
(52) U.S. Cl.
CPC ............................... *G05B 23/0232* (2013.01)
(58) Field of Classification Search
CPC .............................................. G05B 23/0232
See application file for complete search history.

(56) References Cited

U.S. PATENT DOCUMENTS

| 7,218,974 B2 | 5/2007 | Rumi et al. |
| 8,984,533 B2 | 3/2015 | Bezdicek et al. |

(Continued)

OTHER PUBLICATIONS https://smartersolutions.com/books/operational-excellence-books-integrated-enterprise-excellence-five-textbook-series/Smarter solutions. Citing Fig. 4.7 A Leader's Guide . . . Scorecard, Forrest W. Breyfogle III Citius Publishing, 2008.*

(Continued)

*Primary Examiner* — Robert G Bachner

(57) ABSTRACT

Systems and methods for measuring, reporting, controlling, and improving enterprise performance are described. A system receives objective statements for an enterprise, which can be an IEE value chain of the enterprise, and enterprise-specific measurable metrics through an interactive user interface with their associated processes. The system collects historical data and real-time data (e.g., daily) associated with enterprise-specific measurable metrics from a plurality of infield resources and analyses the historical data and the real-time data using a statistical model to provide information that teams can use to determine the strengths and shortcomings of the enterprise. Based on the determined strength and shortcomings, the system provides, using a knowledge database, information so that leadership and teams can determine where to focus process-output metric improvement efforts via process improvement efforts so that the enterprise-as-a-whole financially benefits. Process output response measurements are reported, so there is alignment to the processes that created the output response. The system automatically assesses process-output responses in the IEE value chain for stability, using a statistical technique. If a process-output response is stable, a prediction statement is provided for the metric in the chart's report. If a prediction statement is undesirable, there is a "pull" for a
(Continued)

process improvement effort that is to enhance the metric's response.

12 Claims, 15 Drawing Sheets

Related U.S. Application Data

(60) Provisional application No. 62/196,040, filed on Jul. 23, 2015.

(56) References Cited

U.S. PATENT DOCUMENTS

| | | | |
|---|---|---|---|
| 10,310,474 B2 | 6/2019 | Wernersbach et al. | |
| 2003/0046125 A1* | 3/2003 | Flores | G06Q 10/06313 705/7.23 |
| 2012/0259679 A1* | 10/2012 | Barney | G06Q 10/06 705/7.37 |
| 2014/0163759 A1* | 6/2014 | Anderson | H02J 13/00034 700/291 |

OTHER PUBLICATIONS

Axelrod, J and R and E. (2015), "How investigators cracked the Blue Bell listeria outbreak case," CBS News, https://www.cbsnews.com/news/how-investigators-cracked-blue-bell-listeria-outbreak-case/.

Bloomberg (2019), "Charting GE's Historic Rise and Tortured Downfall," https://www.bloomberg.com/graphics/2019-general-electric-rise-and-downfall/.

Broder, J. (2011), "BP Shortcuts Led to Gulf Oil Spill, Report Says," The New York Times, https://www.nytimes.com/2011/09/15/science/earth/15spill.html.

Colvin, G. and Wahba, P. (2019), "Sears' Seven Decades of Self-Destruction," Fortune, https://fortune.com/longform/sears-self-destruction/.

Egan, M. (2015), "Kmart's sales have fallen off a gigantic cliff," CNN Business, https://money.cnn.com/2015/06/08/investing/kmart-sales-decline-sears-eddie-lampert/.

Galuszka, P (2008), "Eight Reasons Why Circuit City Went Bankrupt," CBS News, https://www.cbsnews.com/news/eight-reasons-why-circuit-city-went-bankrupt/.

Hess, E. (2010), "Stark Lessons From the Dell Fraud Case," Forbes, https://www.forbes.com/2010/10/13/michael-dell-fraud-leadership-governance-sec.html#48d2a97c6d6a.

Sullivan, J. (2017), "Ouch, 50% of New Hires Fail! 6 Ugly Numbers Revealing Recruiting's Dirty Little Secret," https://www.ere.net/ouch-50-of-new-hires-fail-6-ugly-numbers-revealing-recruitings-dirty-little-secret/.

Wiersema, M. (2002), "Holes at the Top: Why CEO Firings Backfire," Harvard Business Review, https://hbr.org/2002/12/holes-at-the-top-why-ceo-firings-backfire.

Wolff-Mann, E., (2019), "Wells Fargo scandals: The complete list," Yahoo Finance, https://finance.yahoo.com/news/wells-fargo-scandals-the-complete-timeline-141213414.html.

Breyfogle III, Forrest W; Leadership System 2.0—Implementing Integrated Enterprise Excellence; 2020.

Breyfogle III, Forrest W; The Integrated Enterprise Excellence System—An Enhanced, Unified Approach to Balanced Scorecards, Strategic Planning, and Business Improvement; 2008.

Breyfogle III, Forrest W; Integrated Enterprise Excellence vol. I—The Basics—Golfing Buddies Go Beyond Lean Six Sigma and the Balanced Scorecard; 2008.

Breyfogle III, Forrest W; Integrated Enterprise Excellence vol. II—Business Deployment—A Leaders' Guide for Going Beyond Lean Six Sigma and the Balanced Scorecard; 2008.

Breyfogle III, Forrest W; Integrated Enterprise Excellence vol. III—Improvement Project Execution—A Management and Black Belt Guide for Going Beyond Lean Six Sigma and he Balanced Scorecard; 2008.

Breyfogle III, Forrest W; Lean Six Sigma Project Execution Guide—The Integrated Enterprise Excellence (IEE) Process Improvement Project Roadmap; 2012.

Breyfogle III, Forrest W; Management 2.0—Discovery of Integrated Enterprise Excellence; 2020.

\* cited by examiner

SYSTEMS AND METHODS FOR MEASURING AND REPORTING ENTERPRISE PERFORMANCE AND MAKING PROCESS IMPROVEMENTS

The present application is a continuation-in-part of U.S. patent application Ser. No. 15/216,467, filed Jul. 21, 2016; which claims the benefit of U.S. Provisional Application No. 62/196,040, filed Jul. 23, 2015; all of which are incorporated herein by reference.

FIELD

Embodiments of the present invention relate to enterprise performance measurement and reporting. In particular, embodiments of the present invention relate to the collection, analysis, prediction, and reporting of data related to enterprise performance and executing process improvement work to get the big-picture benefits.

DESCRIPTION OF THE RELATED ART

In large enterprises, resources such as men and machines may be located across different geographies. Enterprises may also have several defined processes for efficient operations. The success of an enterprise depends largely on how controlled their processes are and how effective data related to those processes are captured from different resources, monitored, and presented to different stack holders. Operational Excellence (OE) is an element of organizational leadership that stresses the application of a variety of principles, systems, and tools toward the sustainable improvement of key performance metrics. How well do traditional systems measure and track the key performance metrics is a concern.

There are several existing systems for monitoring and reporting data of an enterprise or industrial establishments. For example, U.S. Pat. No. 10,310,474 describes a system and method for monitoring and analyzing industrial operations such that data is obtained from one or more sensors of one or more industrial components and transmitted to a master controller as a data stream through a communication network, the transmitted data is captured, copied, and stored for analysis without interfering with the data stream. Another U.S. Pat. No. 8,984,533 describes systems and methods for conducting communications among components of a multi-domain industrial automation system. Another U.S. Pat. No. 7,218,974 describes a method for optimizing an industrial process data. The method includes collecting data from a plurality of sensor elements, wherein each sensor element collects data from a portion of the industrial process and verifying the data collected. The method further includes analyzing the data collected for efficiency and generating at least one recommendation for optimizing the industrial process.

Most of these systems and methods track a fixed set of data and analyze those data in silos and/or as an individual-datum-point value to generate an alarm or take "corrective actions." This form of data collection and reactions do not give focus on the evaluation of an output response as originating from a process, which may need to be improved to achieve a more desirable response later in time. In addition, traditional reporting does not numerically quantify the achievement of organizational desires (including profitability) and customer specification requirements from an on-going process-output response point of view. From a high-level output response point of view, if the needs of business or customer requirements are not being achieved, then changes are needed in the process to enhancement its overall process output response. In large enterprises or industrial establishments, data from one resource, machine, or department may impact the performance of other machines, systems, other departments, and the overall performance of the organization. It has been observed that inconclusive performance metrics are a disaster waiting to happen. For different types of enterprise or industrial set-up, different performance metrics may be required. Existing systems lack the ability to link the source of process inputs, including its procedural execution steps and their impact on key performance metrics. What data are collected from infield resources and how those data are analyzed can play a major role in the effective management of an enterprise.

Therefore there is a need for a system that allows measuring and tracking the right set of process-output-response data and providing actionable feedback ahead of time to avoid potential disaster.

The present disclosure makes possible a number of the needed solutions and makes a material and substantial improvement to the current state of the art for measuring and tracking key performance metrics, including identification of the need to make improvements to a process when an overall process-output response is undesirable.

SUMMARY

Systems and methods are described for measuring and reporting enterprise performance. Systems and methods are provided for observing metrics from a process point of view so as to drive the right behavior that leads to process improvement efforts. According to an embodiment, a system receives one or more objective statements of an enterprise as part of an Integrated Enterprise Excellence (IEE) value chain of the enterprise, which structurally aligns process output responses with the processes that created them, and a plurality of enterprise-specific measurable metrics through an interactive user interface from a user. The system collects historical data and real-time data associated with each of the plurality of enterprise-specific measurable metrics from a plurality of infield resources through a communication network and analyses the historical data and the real-time data using a statistical model to determine the strengths and shortcomings of the enterprise. Based on the determined strength and shortcomings, teams with the aid of information from this system can recommend one or more recommended measurable metrics in view of the one more objective statements of the enterprise using a knowledge database.

In an embodiment, the system facilitates the creation of one or more strategic recommendations to overcome the shortcoming of the enterprise using a machine learning model. The system may receive inputs or analysis from teams and may identify one or more process improvement plans and one or more lower-level performance metrics aligned to the one or more process improvement plans based on the analysis of the historical data and the real-time data. Often with traditional process improvement efforts, there is no demonstration statistically in a time-series fashion that an output response improved. Often the statement of what was achieved from a traditional process improvement effort is only anecdotal with no statistical process-output enhancement response validation. In the present system, process improvement is demonstrated statistically in a unique time series chart. After a team has improved a process so that the process output response has transitioned statistically to a quantified better level of performance and better achieves the needs of both the business and customers' needs, it is important to "maintain the gain." With traditional process improvement efforts, the "control" mechanism can be someone returning to a manufacturing cell to observe whether new procedures are being followed or not. The traditional approaches are very ineffective and costly (an untimely-feedback) approach for "maintaining the gain from the newly created process", if this periodic monitoring gets done at all. The system offers a "control mechanism" by providing performance metrics by further collecting infield data associated with the one or more recommended metrics and the one or more lower-level metrics from the infield resources, analyzes the infield data to identify deviation from expected results, can generate an alert based on identified deviation, which can be sent to a concerned person based on nature of the alert. The system provides the process-output response of one or more recommended metrics to assess the impact of the execution of the one or more process improvement plans. In addition, the system provides process-output metric reporting for other performance metrics through an IEE value chain. Information provided through the IEE value chain can provide insight into additional metric improvement opportunities that can be undertaken to benefit the business as a whole.

In an embodiment, the system provides an interactive user interface through which a remote user can monitor the IEE value chain of the enterprise, one or more processes associated with an individual component of the IEE value chain, a statistical-graphical representation of data associated with the plurality of enterprise-specific measurable metrics, graphical representation of data associated with the one or more recommended measurable metrics, graphical representation of data associated with the one or more lower-level measurable metrics and visual representation of the impact assessment. The system may generate different custom reports for a plurality of effective management attributes. For example, the effective management attributed includes but is not limited to executive performance management review, decision-making process, strategy formulation, scoreboard/dashboard reporting, and enterprise improvement efforts.

The systems and methods of the present invention facilitate organizational orchestrated movement toward the achievement of the 3Rs of business, i.e., everyone doing the right things and doing them Right at the Right time.

Other features of embodiments of the present disclosure will be apparent from accompanying drawings and detailed description that follows.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description applies to any one of the similar components having the same first reference label irrespective of the second reference label.

DETAILED DESCRIPTION

Figure 1:
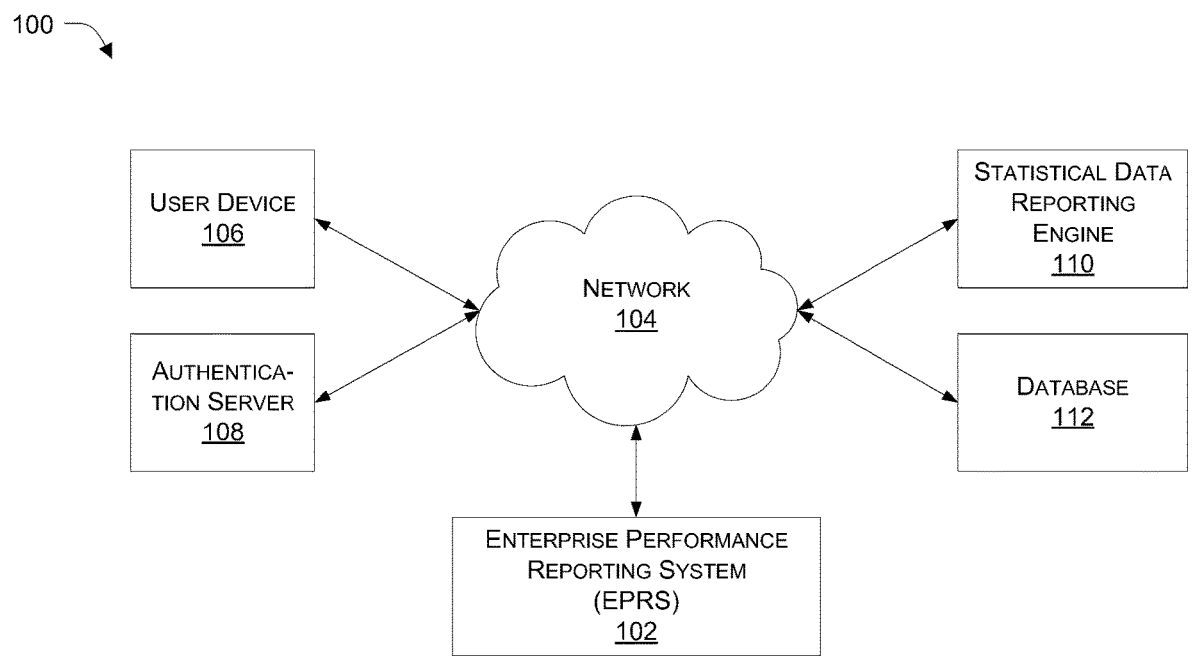
FIG. 1 conceptually illustrates an enterprise network for monitoring and reporting the performance of an enterprise in accordance with an embodiment of the present disclosure.

Described here are systems and methods for measuring, reporting, controlling, and improving enterprise performance. A system allows a user (e.g., business leaders) to submit objective statements of an enterprise, which can be an IEE value chain of the enterprise), and enterprise-specific measurable metrics through an interactive user interface with their associated processes. The system collects historical data and real-time data (or on daily or at any defined interval) associated with enterprise-specific measurable metrics from a plurality of infield resources and analyses the historical data and the real-time data using a statistical model to provide information that teams can use to determine the strengths and shortcomings of the enterprise. Based on the determined strength and shortcomings, the system provides, using a knowledge database, information so that leadership and teams can determine where to focus process-output metric improvement efforts via process improvement efforts so that the enterprise-as-a-whole financially benefits. Process output response measurements are reported, so there is alignment to the processes that created the output response.

The system automatically assesses process-output responses in the IEE value chain for stability using a statistical technique. If a process-output response is found to be stable, a prediction statement is provided for the metric in the chart's report. If a prediction statement is undesirable, there is a pull for a process improvement effort that is to enhance the metric's response. The system predicts such undesirable outcomes and recommends processes that can improve the existing process and metrics to be measured.

The enterprise improvement effort is summarized in an Enterprise Improvement Plan (EIP), which is analytically determined, and an IEE value chain process-output response owner who is to work with his/her team to make improvements to the process is assigned so that their process-output response achieves a statistically determined significant improvement, as shown in its IEE performance metric report-out. The system allows all authorized users to see works and improvement efforts being undertaking and performance metrics status in the organization's IEE value chain. The reports can be accessed from anywhere anytime by any authorized user.

The system collects infield data associated with the IEE value-chain metrics and the lower-level metrics from the infield resources, analyses the infield data to identify deviation from the desired result, and generates transparent reports that can be viewed by anyone authorized 24×7. The information from this reporting can be actionable from either resolution to a current special-event problem or process improvement activity need/completion. Alerts can be sent to a concerned person based on the nature of the alert. This methodology helps organizations move toward the achievement of the 3Rs of business; i.e., everyone doing the right things and doing them right, at the right time.

The detailed description set forth below in connection with the appended drawings is intended as a description of exemplary embodiments in which the presently disclosed process can be practiced. The term "exemplary" used throughout this description means "serving as an example, instance, or illustration," and should not necessarily be construed as preferred or advantageous over other embodiments. The detailed description includes specific details for providing a thorough understanding of the presently disclosed method and system. However, it will be apparent to those skilled in the art that the presently disclosed process may be practiced without these specific details. In some instances, well-known structures and devices are shown in block diagram form to avoid obscuring the concepts of the presently disclosed method and system.

Embodiments of the present invention include various steps, which will be described below. The steps may be performed by hardware components or may be embodied in machine-executable instructions, which may be used to cause a general-purpose or special-purpose processor programmed with the instructions to perform the steps.

Embodiments of the present invention may be provided as a computer program product, which may include a machine-readable storage medium tangibly embodying thereon instructions, which may be used to program the computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within the single computer) and storage systems containing or having network access to a computer program(s) coded in accordance with various methods described herein, and the method steps of the invention could be accomplished by modules, routines, subroutines, or subparts of a computer program product.

The terms "connected" or "coupled" and related terms are used in an operational sense and are not necessarily limited to a direct connection or coupling. Thus, for example, two devices may be coupled directly or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not required to be included or have the characteristic.

As used in the description herein and throughout the claims that follow, the meaning of "a," "an," and "the" includes plural reference unless the context dictates otherwise. Also, as used in the description herein, the meaning of "in" includes "in" and "on" unless the context dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

As used herein, a "network resource" generally refers to various forms of data, information, services, applications, and/or hardware devices that may be accessed via a network (e.g., the Internet). Non-limiting examples of network resources include web applications, cloud-based services, network devices, and/or associated applications (e.g., user interface applications), and network security devices and/or associated applications (e.g., user interface applications). Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular name.

A system for effective measurement, reporting, and management of enterprise performance is described. The system for measurement, reporting, and management of enterprise performance employing an IEE 9-step enhanced business-management methodology embedded with computing resources is described.

The system provides organizational scorecard/dashboard reporting that provides a significant enhancement in comparison to traditional reporting such as red-yellow-green scorecards and tables-of-numbers, which can lead to organizational firefighting or unhealthy, if not destructive, behaviors.

The system enables business control, risk assessment/avoidance measurement tracking, and automatic-update reporting that indicates when a KPI metric (reported from a process-output point of view) has transitioned statistically to a worse condition (or an individual special-cause event has occurred) so that corrective action can be timely taken.

The proposed system and methodology separates in its time-series tracking, the metric's up-and-down and typical noise variation from unusual events, for identification of significant statistical trend-changes or an unusual event identification in the response-output from a process.

The proposed system uses normal and transformed normality probability plots to describe the performance of a continuous response (even when no specification exists) that can be automatically updated (e.g., daily). This form of capability reporting addresses the statistical shortcomings of traditional Lean Six Sigma process capability analysis and reporting techniques.

Proposed here are methods for reporting performance metric of an organization that can link the performance metric with the processes that created them throughout an IEE value chain (i.e., the entire organization—not just operations—for example, HR, IT maintenance, and support functions) and can be automatically updated (e.g., daily). If the performance metric is undesirable, that need "pulls" for the creation of a process improvement project that is related to the processes that created it.

For positive results from process improvement efforts to be long-lasting, the system proposes a control mechanism to maintain the gain from improvement process efforts (and control other metric response in general). The IEE value chain, with its automatic updated reporting, provides a means for fulfilling this need by having an availability of all metrics and processes to all authorized users throughout an organization (line worker to CEO). If an automatically IEE value chain metric that was improved digresses to a lesser-level-of-performance, corrective action needs to be taken in a timely fashion. This methodology works much better than a traditional Lean Six Sigma approach, where process work is to be periodically examined to determine if operational people returned to their old ways of doing work.

Organizations typically, in their reporting to upper management, create special reports (e.g., table of number or red-yellow-green scorecard). People at the bottom of the organizational food-chain may see an issue but are concern about telling people up the food chain because of "shooting the messenger" fear. This fear of reporting an issue can lead to catastrophic results, including death (e.g., BP oil spill and Blue Bell *Listeria* contamination problem). The proposed system offers transparency in that every authorized user has access to all IEE value chain metrics and processes from the line worker to the CEO. Periodic reports to leadership in this system should be made using the automatically updated IEE value chain, which has up-to-date metrics (unlike what is often presented in PowerPoint presentations, which has outdated information at the time of the presentation). If there is "bad news," the IEE value chain should reflect this and let the chips fall where they may—hopefully with leadership taking timely corrective action before "really bad" things occur. This addresses the "accountability" issue head-on, in which leadership and management need to take appropriate action to prevent bad things from happening. This is consistent with the spirit of additional government regulations being added to address the Enron management issue at the turn of the century and 2008 business collapse.

The method provides process output responses that are in physical alignment with the process that created them through an IEE value chain. In the relations $Y=f(X)$, if the Y value (process output response) is not desirable, then the X's (process) need improvement.

The method and system facilitate organizational goal setting that leads to process improvement so that the big-picture benefits (e.g., average monthly reported EBITDA in a for-profit company or wise use of money in a non-profit)—simply identifying improvement projects though a common Lean Six Sigma problem statement can have a significant issue when a high-level accompanying metric that is to be improved is not identified. In addition, the Lean Six Sigma approach without an EIP can lead to process improvement efforts that are in silos and do not benefit the big picture. Also, with many Lean Six Sigma deployments, 100 million dollars may be reported in savings, but nobody can find the money. The proposed system provides the improvement of KPIs that are important to the business (reported as a process output response). These KPIs are enhanced through process-improvement projects so that these KPIs improve, and the overall mean monthly reported financials improve. EIP shows (FIG. 8) the alignment of process metric responses that are to be improved, so the big-picture benefits.

The system enables the creation of an IEE Enterprise Improvement Plan (EIP), which identifies high-level operational performance metrics that need improvement so that the big picture benefits. From an EIP, KIPS reported from this methodology process metric standpoint need improvement, so the big picture is enhanced. The system assigns an IEE value chain owner for each KPI-process-reported metric that is to be improved through an EIP. This process owner will be asking for timely completion of the process's improvement project so that it improves their process's metric performance since they will be giving a frequent status report of the metric and process improvement work. (e.g., monthly or weekly reporting). With the proposed system, process improvement projects are described and reported through the methodology and can be viewed by all relative to the status of project work and metric improvement 24×7.

When someone observes something in an automatically-updated IEE value chain (e.g., metric abnormality) that needs reporting to leadership or a process owner, this information can easily be conveyed through an appropriate communication medium (e.g., e-mail system).

A system facilitates collective reporting of all EIP metrics that are to be enhanced through improvement projects so that every one authorized has 24×7 access to current project work and the status of the metric that is to be improved.

The system provides a consistent means for an organization to pursue either application to the Malcolm Baldrige award or addressing its criteria aspects in their organization.

The system facilitates the organizations to pursue ISO 9001, which requires less special preparation work for audits and can be actively used within the execution of day-to-day work in the company, which is often not done with current ISO 9001 work in organizations.

The system provides a means to communicate measures and process improvement work from suppliers, which can result in higher quality and more timely received deliveries.

The system provides a means for the achievement of the Shingo Prize and other awards because the methodology is in alignment with the basic criteria for all these awards. As reported, many well-respected companies such as Circuit City (Galuszka 2008), GE (Bloomberg 2019), K-mart (Egan 2015), and Sears (Colvin and Wahba 2019) have experienced a significant decline or completely collapsed. Other esteemed corporations such as Dell (Hess 2010) and Wells Fargo (Wolff-Mann 2019) made news headlines because they set and gave focus to the achievement of organizational measurement goals that led to harmful behaviors. Companies have replaced their CEOs with an expectation to improve the company's bottom-line but instead experienced problems, including short-term tenure. (Sullivan 2007 and Wiersema, 2002). BP's Gulf of Mexico oil spill (Broder 2011) and Blue Bell Ice Cream's *Listeria* contamination (Axelrod and Rand 2015) are two examples of the dreadful consequences, including death, which can occur when esteemed companies do not respond to operational issues in a timely fashion. Management at these companies had good intentions and many highly skilled people. Still, they lacked an objective, repeatable, and focused set of processes that would have shown management the real state of their business. They had used either ad-hoc management or ineffective methods that did not deliver predictable business improvements. The proposed system and method may help organizations to overcome some of these issues.

FIG. 1 conceptually illustrates an enterprise network for monitoring and reporting the performance of an enterprise in accordance with an embodiment of the present disclosure. As shown in FIG. 1, an enterprise performance reporting system (EPRS) 102 can be accessed by user device 106 once authenticated by the authenticator server 108. All users having valid credentials can access the EPRS 102, and access data may be controlled based on the clearance level of the user EPRS system can be accessed by a user through a network 104 (e.g., LAN, WAN, or the Internet, etc.). In an embodiment, the statistical data reporting engine 110 workings, in combination with the EPRS 102 may collect data from infield devices, equipment, or users, and present the data through an active dashboard to authorized users across the value chain in the organization. The EPRS 102 and associated reports can be accessed from anywhere, anytime, and by anyone having valid credentials. In an embodiment, the historical data, processes, metrics used, etc. can be stored in the database 112.

Figure 2:
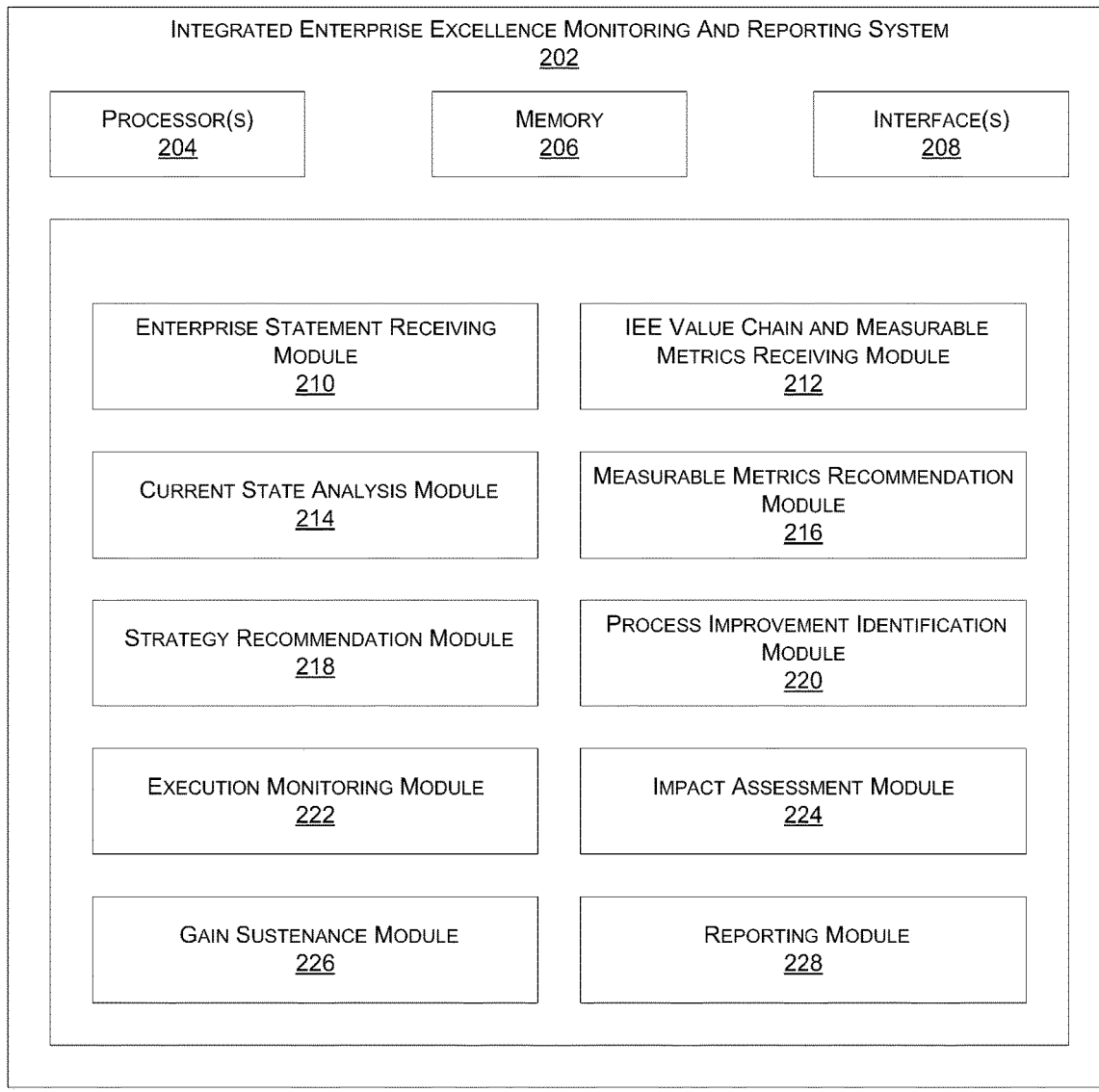
FIG. 2 illustrates an exemplary block diagram of an integrated enterprise excellence monitoring and reporting system in accordance with an embodiment of the present disclosure.

FIG. 2 illustrates an exemplary block diagram of an integrated enterprise excellence monitoring and reporting system in accordance with an embodiment of the present disclosure. The integrated enterprise excellence monitoring and reporting system 202, which may be implemented on a server or using a cloud-based infrastructure, may use one or more processor(s) 204 to run the instructions stored in memory 206. The system 202 may receive data from internal memory 206 or from the network through a suitable interface(s) 208. The system 202 may provide an interface(s) for user interaction as well for communication with external networks and devices. The system 202 includes an enterprise statement receiving module 210 configured to receive, at a computing device, mission/vision statements of an organization through an interactive user interface from a user. The enterprise statement receiving module is configured to receive one or more objective statements of an enterprise comprises mission statement, vision statement, value statement, and response to Jim Collins' three-circle questions.

The system 202 includes an IEE value chain and measurable metrics receiving module 212 configured, at the computing device, to receive an IEE value chain of the and a plurality of enterprise-specific measurable metrics from the user. The system 202 includes a current state analysis module 214 configured, at the computing device, to collect historical data and real-time data (e.g., daily) associated with each of the plurality of enterprise-specific measurable metrics from a plurality of infield resources through a communication network, and analyze the historical data and the real-time data (e.g., daily) using a statistical model to determine if each of the enterprise-specific measurable metrics are predictive or a special-cause event(s) has occurred, which may need timely resolution. The system further includes a reporting module 228 configured to report through an active dashboard status of defined processes through the IEE value chain based on analysis by the statistical model, wherein the dashboard presents a metric-report-out chart with the predication statement if a process response in the IEE value chain is considered predictable based on the analysis by the statistical model, or with an alert for the special-cause event(s). The active dashboard facilitates teams and leadership to use the process-output reporting to create meaningful and effective statistically-insight-provided action plans that benefit the enterprise as a whole. The enterprise-specific measurable metrics are reported from a high-level process output-response perspective, which includes the variability of the process and separates typically process output-response "noise" from unusual events or process-output response-trends.

The reporting of data associated with the plurality of enterprise-specific measurable metrics, comprising of organizational Key Performance Indicators (KPIs) or other metrics, provides a predictive statement of what can be expected in the future for a process's output.

In the embodiment, the reporting module provides a risk assessment and avoidance measurement tracking and automatic reporting when a key performance indices (KPI) metric of the plurality of enterprise-specific measurable metrics has transitioned statistically to a worse condition or when the special-cause event is detected. For ease of tracking and efficient operation, each of the plurality of enterprise-specific measurable metrics is linked to the processes that created them throughout an IEE value chain. The reporting module 228 may reflect how data and different processes and metrics are related.

The system 202 may include a control module configured to facilitate tracking and maintenance of gain through the process improvement recommendation, for positive results from process improvement recommendation to be long-lasting, and a goal-setting module configured to facilitate one or more stack-holders to create an organizational goal that leads.

The system 202 may include a strategy recommendation module 218 configured, at the computing device, to provide information for the creation of one or more strategic recommendations to overcome the shortcoming of the enterprise using a machine learning model.

The system includes a process improvement identification module 220 configured to identify one or more process improvement plans (also referred to as Enterprise Improvement Plan (EIP) and one or more lower-level performance metrics aligned to the one or more process improvement plans based on the analysis of the historical data and the real-time time-series high-level performance reported data. The system 202 further includes an execution monitoring module 222 configured to collect infield data associated with the one or more recommended metrics and the one or more lower-level metrics from the infield resources, analyze the infield data to identify deviation from expected results, generate in one chart an assessment report of process-output response stability, from a process-output point of view with the incorporation of a predictive assessment and futuristic expectation for a stable process for all metrics throughout an organizational IEE value chain.

The system 202 further includes an impact assessment module 224 configured to provide insight information relative to one or more EIP-identified metrics to improve and one or more lower-level metrics to assess the impact of the execution of the one or more EIP process improvement plans.

In an embodiment, the reporting module 228 is configured to allow a remote user to monitor through an interactive user interface one or more functional aspects of the IEE value chain of the enterprise, one or more processes associated individual component of the IEE value chain, graphical statistical assessment of a process output response to determine process stability, graphical representation of the plurality of enterprise-specific measurable metrics that includes both an assessment of process stability and provides a predictive statement for a process output response in one chart, graphical statistic-based metric reporting that graphically shows when a process response has change, perhaps for betterment from a process-improvement project or degradation for whatever reason, graphical representation of data associated with the plurality of enterprise-specific measurable metrics, graphical representation of data associated with the one or more recommended measurable metrics, graphical representation of data associated with the one or more lower-level measurable metrics; and visual representation of the impact assessment.

The reporting module may generate custom reports for a plurality of effective management attributes, wherein the plurality of effective management attributes comprises executive performance management review, decision-making process, strategy formulation, scoreboard reporting, and enterprise improvement efforts.

In an embodiment, the system maintains a knowledge database that maintains the repository of determining metrics that provide insight to each function's performance in an IEE value chain from a quality, cost, and time perspective (which includes efficiency and effectiveness). With this focus on high-level process output response metrics throughout the business, an organization might identify that process improvement efforts are need in support organizations such as HR to do a more effective job in their hiring process of new employees.

The system 202 may include a gain sustenance module 226 configured to provide inputs through an active dashboard on measure and metrics that needs to run effectively in order to sustain the gain achieved through process modification and adaptation.

Figure 3:
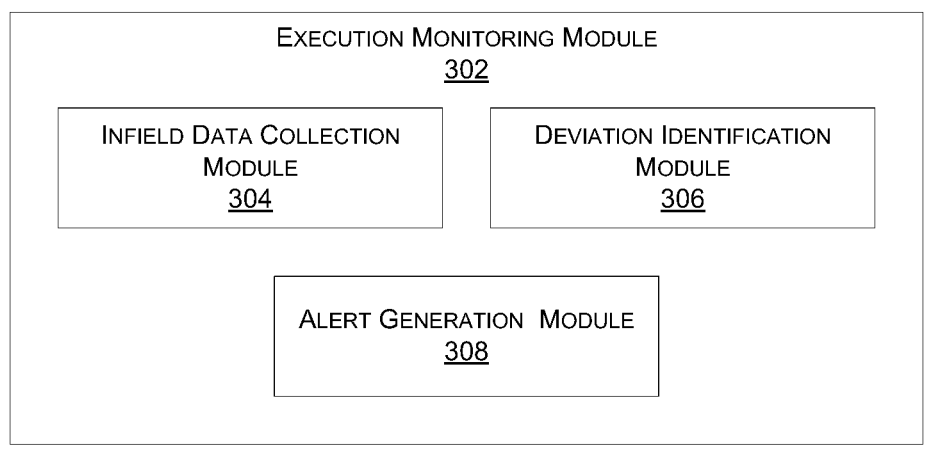
FIG. 3 discloses functional modules of an enterprise performance monitoring and reporting system in accordance with an embodiment of the present disclosure.

FIG. 3 discloses functional modules of an enterprise performance monitoring and reporting system in accordance with an embodiment of the present disclosure. In an embodiment, an execution monitoring module 302 (same as the execution monitoring module 222) may include an infield data collection module 304 configured to collects historical data and real-time data (e.g., daily) associated with enterprise-specific measurable metrics from a plurality of infield resources, and a deviation identification module 306 configured to analyses the historical data and the real-time data using a statistical model to provide information that teams can use to determine the strengths and shortcomings of the enterprise. The infield resources may be a device, sensor, equipment, or a human user. The execution monitoring module 302 further includes an alert generation module 308 configured to determine determined strength and shortcomings using a knowledge database and report process output response measurements, so there is alignment to the processes that created the output response. Using a statistical technique, module 302 automatically assesses process-output responses in the IEE value chain for stability. If a process-output response is stable, a prediction statement is provided for the metric in the chart's report. If a prediction statement is undesirable, there is a "pull" for a process improvement effort that is to enhance the metric's response.

Figure 4A:
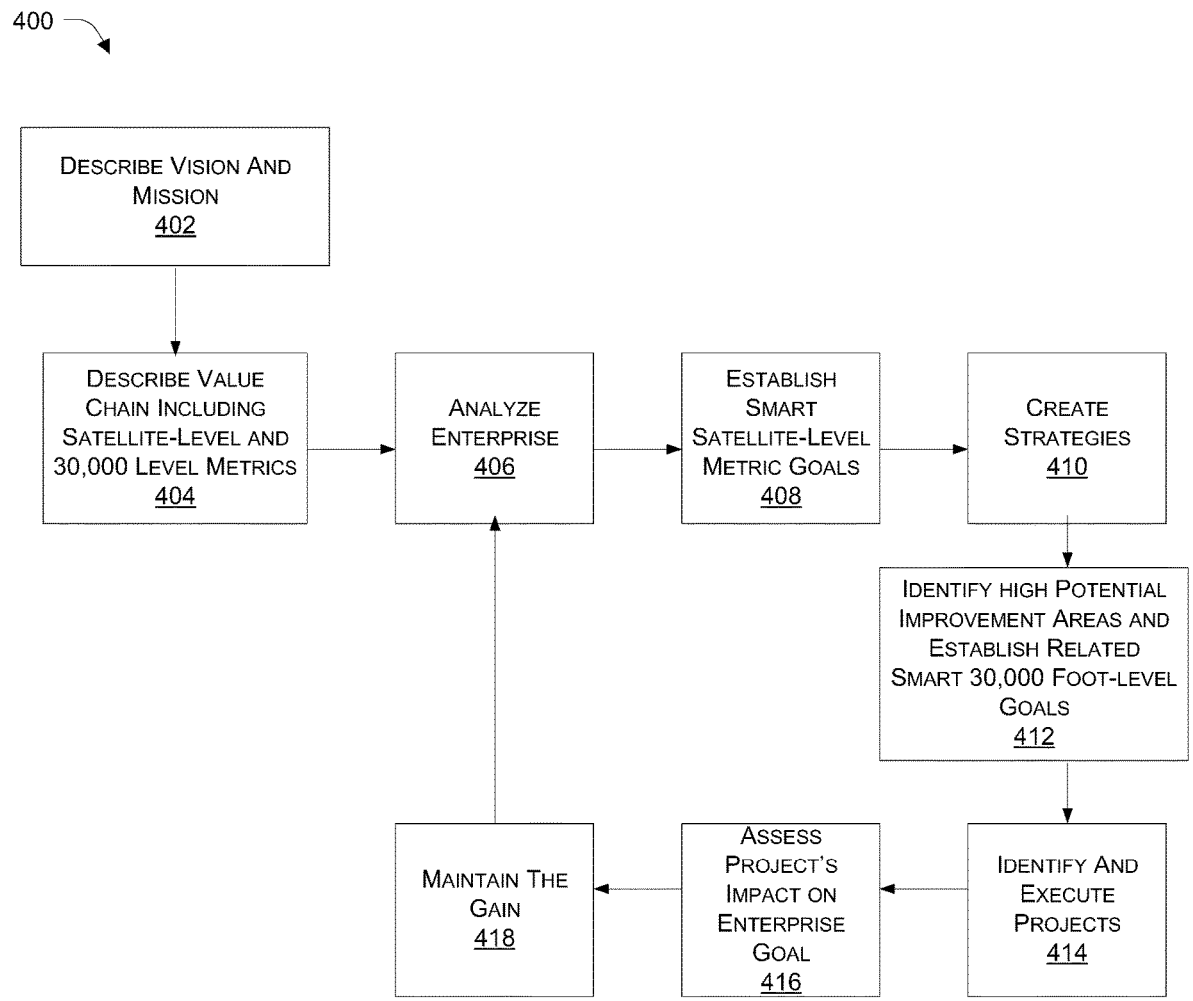
FIG. 4A represents a 9 step IEE system for enterprise effective management in accordance with an embodiment of the present disclosure.

FIG. 4A represents a 9-step IEE system for enterprise effective management in accordance with an embodiment of the present disclosure. The system provides enhanced performance metric reporting, integrated enterprise excellence (IEE), performance, performance metrics reports, help determine process improvement efforts with big picture benefits, helps in execution of business process improvement efforts, and list IEE summary. The 9 step IEE system includes functional modules that help to describe the vision and mission of an enterprise, as shown at block 402, describe value chain including satellite level and 30,000 feet level metrics as shown at block 404, analyze enterprise as shown at block 406, establish SMART satellite level metric goals as shown at block 408, create strategies as shown at block 410, identify high potential improvement areas and establish related SMART 30,000 foot level metrics goal as shown at block 412, identify and execute projects as shown at block 414, assess project's completion impact on enterprise goals as shown at block 416, and maintain the gain as shown at block 418.

As shown in FIG. 4A, step 1 (block 402) of the IEE model includes receiving the company's vision, mission, values, and responses to Jim Collins' three-circle questions about a business. The three-circle questions include:
1) What can you be the best in the world?
2) What drives your economic engine?
3) What are you deeply passionate about?

High-level statements created in a traditional executive retreat often could be considered an aspect of this first step of the IEE system. The mission, vision, and values statements provide direction for the subsequent eight steps.

Step 2 (block 404) allows the organization to create an IEE value chain, which includes allowing the organization to create its satellite-level (financial, e.g., EBITDA reported monthly) and 30,000-foot-level performance metrics (operational; e.g., non-conformance rate, lead time, or supplier on-time delivery, reported daily, weekly, or monthly). An IEE value chain describes what an organization does and how it measures what is done. For an organization, an IEE value chain should maintain fundamental consistency over time, independent of leadership, competition, and environmental changes. However, the specifics of what is done in an organization's IEE value chain should be enhanced continuously to make the enterprise, as a whole, better over time. The identification and execution of enterprise-as-a-whole enhancement activities are what the next steps of the IEE 9-step system provide.

At step 3 (block 406), the current state of high-level value-chain metrics is evaluated collectively with other information such as VOC (Voice of the Customer), TOC (Theory of Constraints) information, and competitive analyses. The analysis may use statistical techniques, when appropriate, to determine the strengths and shortcomings of an organization for providing direction in the execution of Step 4 through Step 7.

In step 4 (block 408), the system establishes smart satellite-level metric goals. For example, in IEE, the satellite-level measures are to be financial. This step's objective, as the response to underlying processes, is to have a numerical quantity that is consistent with fulfilling step 1's organizational vision and mission statements and satisfying customer needs. For a for-profit organization, an appropriate financial satellite-level goal might be a mean monthly EBITDA objective. A step 4 goal does not need to be an enhancement to the satellite-level metric's current response level but could be the continuance of the organization's current response level. For government, schools, non-profits, and other similar organizations, EBITDA, or any measure of profit or revenue, may not be an appropriate encompassing measurement to address in this step. For these situations, there is a need for an alternative high-level organizational performance measurement for this step. Non-profits and government agencies might state that money are not relevant to them. However, there is still a necessity for the management of expenses in non-profits, government agencies, and schools, which can address step 4's monetary goal objective. For non-profit organizational situations, a step 4 satellite-level metric goal might be mean monthly operating expenses. For this situation, the intention would be to enhance organizational processes so that there is an enrichment in the organization's deliverables that is consistent with this step's stated satellite-level metric goal.

In step 5 (block 410), the results from Steps 1-4 provide input to strategy creation. Using system input, leadership inputs, one or more strategies can be created.

In step 6 (block 412), the system helps identify high potential improvement areas and establish 30,000-foot-level performance metric goals. An enterprise improvement plan (EIP) graphic presents the results of this work.

In step 7 (block 414), the system facilitates the identification and execution of process improvement projects that improve operational 30,000-foot-level metrics and benefit the enterprise as a whole.

In step 8 (block 416), the system facilitates in assessing how the completion of projects is impacting the achievement of step 4's enterprise goal. An EIP is to show the alignment of undertaken projects to the needs of the enterprise and step 4's fulfillment. The staging of a project's 30,000-foot-level to an enhanced level of performance shows the amount of statistical benefit achieved to a metric through a project's execution.

In step 9 (block 418), the system helps in error-proofing a process. Error-proofing the process is the best means of process control. However, error-proofing is not possible for all situations. A high-level metric-tracking control methodology may be used by the periodic monitoring of organizational 30,000-foot-level process-output responses to ensure nothing has degraded. An Enterprise Performance Reporting System (EPRS) software provides a means for automatic updates for a project's 30,000-foot-level metric in the organization's IEE value chain, which can be monitored periodically for degradation so that timely corrective action can be taken when appropriate.

Figure 8:
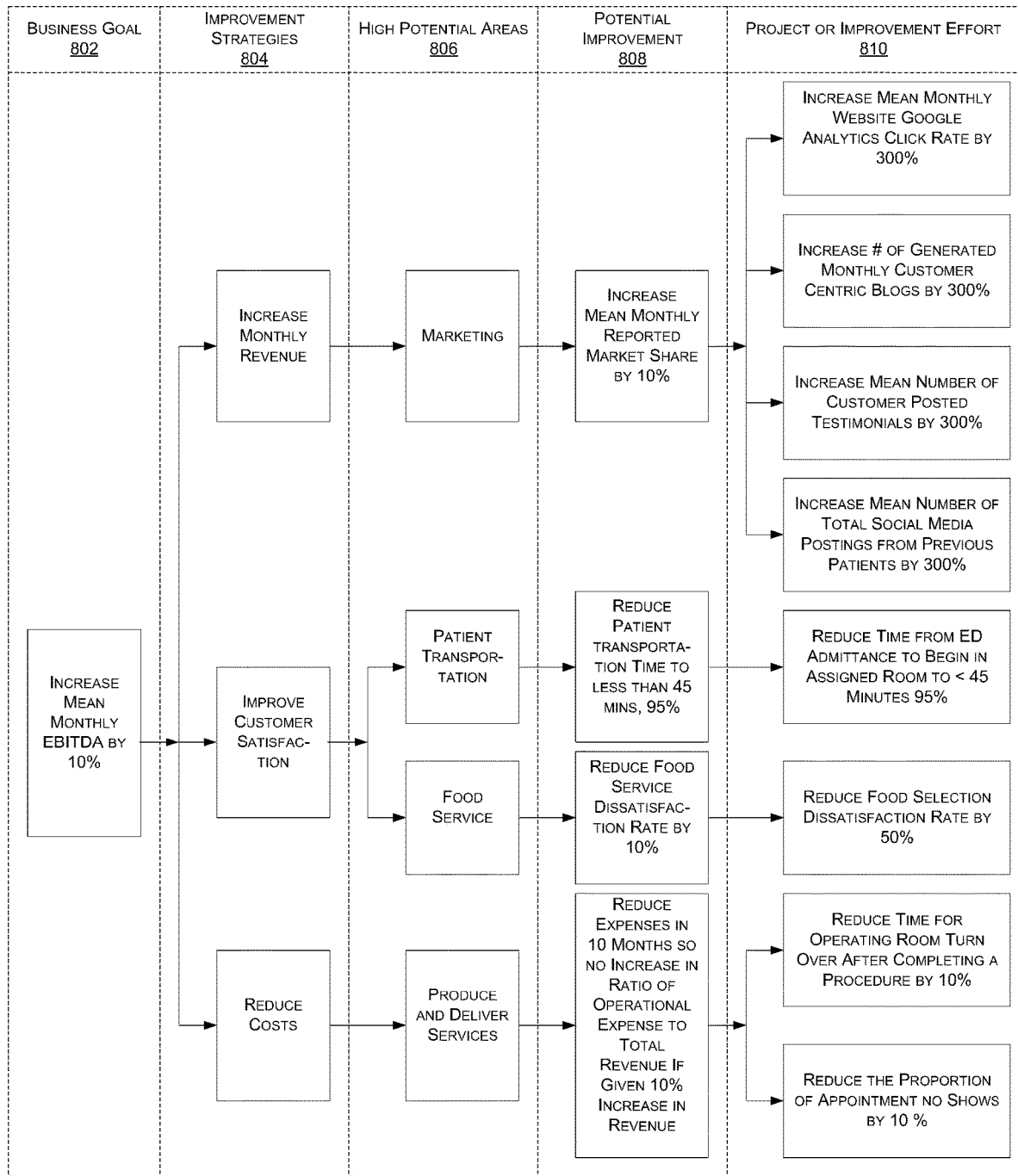
FIG. 8 illustrates an example enterprise improvement plan (EIP) report in accordance with an embodiment of the present disclosure.

An EIP, as shown in FIG. 8, visually describes the results from steps 4-7 of the IEE system and agreed-to 30,000-foot-level metric process improvement efforts that are in alignment with the achievement of step 4's organizational performance-metric goals. A significant component of this effort should be enhancing the fulfillment of customer deliverables relative to the customer's wants, needs, and desires in the most efficient and effective means possible.

With the focus given to improving organizational IEE value chain metrics, which has owners and is highlighted by an organization's EIP, regularly scheduled leadership meetings discuss the status of process-improvement projects. In these meetings, presentations provide the current state of the identified strategic 30,000-foot-level responses targeted for improvement with the status of their associated process-improvement projects. Such a presentation and discussion lead to a sense of urgency for the timely completion of identified projects and enhancements to associated performance metric responses.

To illustrate the benefit of the IEE approach for focusing on organizational improvement activities over traditional executive retreat strategies, as described earlier, consider this situation. A for-profit company determined, using the 9-step IEE system, that the most critical opportunity for improving its financials, as described in its EIP, is to enhance its organization's processes so that customer non-conformance rates decline. Such a targeted enterprise-as-a-whole focus to improve both an organization's financials and customer satisfaction would typically never have such a highlighting using a traditional executive-retreat-strategic-creation-statements approach.

Figure 4B:
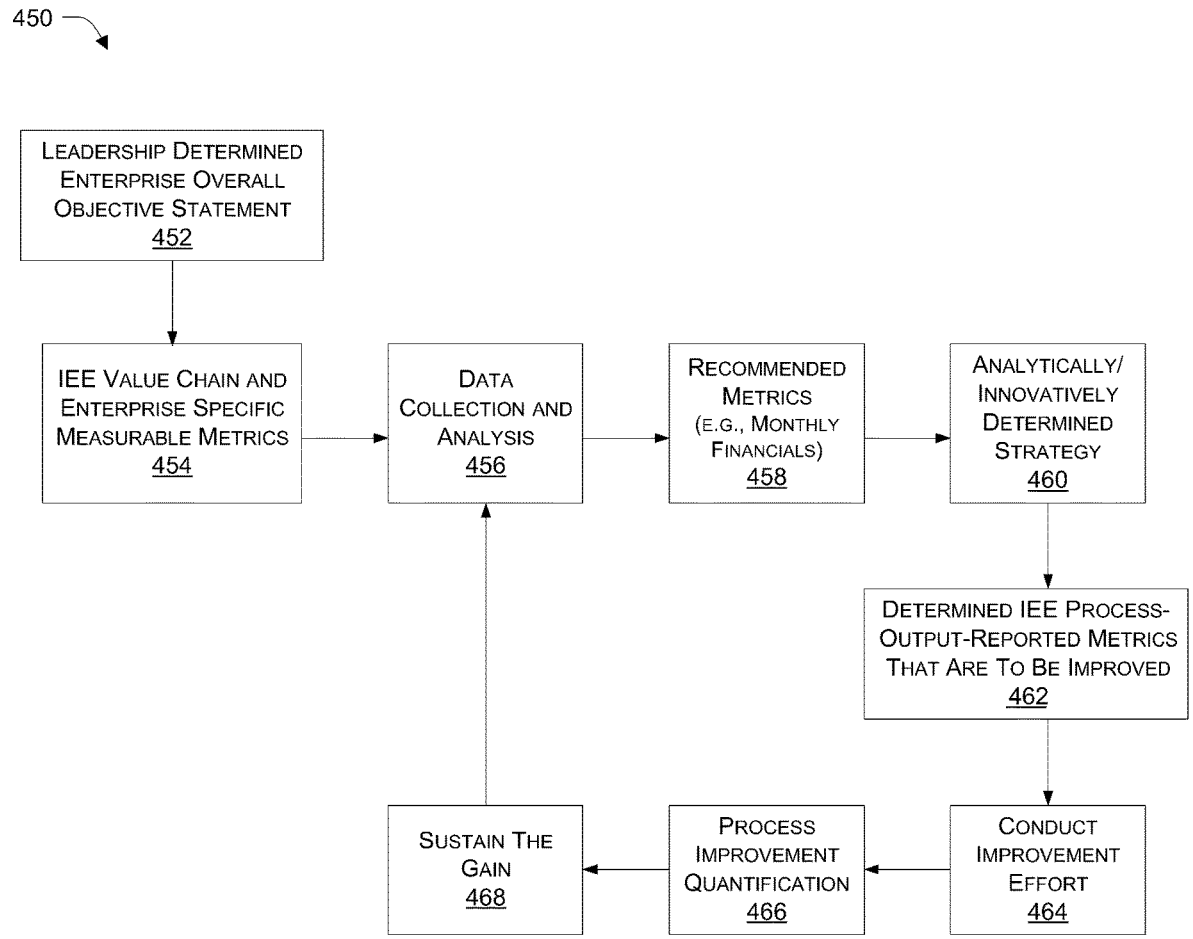
FIG. 4B represents functional sub-modules of the execution monitoring module in accordance with an embodiment of the present disclosure.

FIG. 4B represents a 9-step IEE system for effective enterprise management used in an industry in accordance with an embodiment of the present disclosure. The proposed system and the 9-step business management model can be used in any industrial, corporate, for-profit organization, a non-profit organization, academic institution, hospitals, etc. and is not limited to the examples given in the description. The system may receive leadership determined enterprise overall objective statement (e.g., mission, vision, etc.) as shown at block 452, and receive/determine IEE value chain and enterprise-specific measurable metrics, as shown at block 454. The enterprise-specific measurable metrics can also be presented to the user based on the nature of the organizational set-up. The system suggests data collection sources include from infield device, equipment, and user for analyses and suggests methodologies for analyzes of the infield data and historical data to determine sources of potential enterprise-as-a-whole improvement efforts, as shown in block 456. The system allows users to provide goals (e.g., monthly IEE-mean-reported financial goals such as EBITDA or profit margins), as shown in block 458. The system analytically determines the strategy for achieving the goals and meet the big pictures aligned with the objective statement. The system provides analytically determined strategies, as shown in block 460.

An IEE value chain describes what an organization does and how it measures (with automatic updating) what is done using the process-output reporting methodology described in this disclosure. The recommended metrics can be financial monthly reported mean or median reported metric goal that is desired. For example, enterprise monthly reported a mean increase in EBITDA goal. Further, the system help in analytically or innovatively determined strategy, as shown in block 460. The system provides determined IEE process-output-reported metrics, as shown at block 462, that are to be improved via process improvement efforts. In an embodiment, each metric that is to be improved should have an IEE value chain owner when possible and be in an overall associated organizational enterprise improvement plan [EIP]. Further, the system helps in conduct improvement efforts to enhance EIP identified metrics using methodologies such as Lean Six Sigma, PDCA, kaizen events. The system measures and reports, as shown at block 466, quantification of the benefits from process improvements through an IEE reported output of process transitioning to an enhanced level of performance. The system helps in sustaining the gain (as shown at block 468) of the process improvement efforts by reporting new processes and their metric enhancements in the IEE value chain, which all authorized users can access 24×7, and monitor the improved metric from an IEE high-level response point of view using EPRS software that provides automatic updates of all value chain metrics, (e.g., daily). If a process-metric-output response has degraded, the process owner can be notified, if necessary, to take timely action to resolve the issue. Note how step 468 loops back to step 456; hence, with this system, there is conceptually a Dr. Deming Plan-do-check-act process improvement effort for the enterprise as a whole. FIG. 8 lays out an example IEE value chain for monitoring the performance of a hospital in accordance with an embodiment of the present disclosure. Wherewith EPRS software, this drill-down would be through a simple "click of the mouse" on any computer or smartphone by anyone in an organization who has authorization and access to the server that contains the information.

Figure 5:
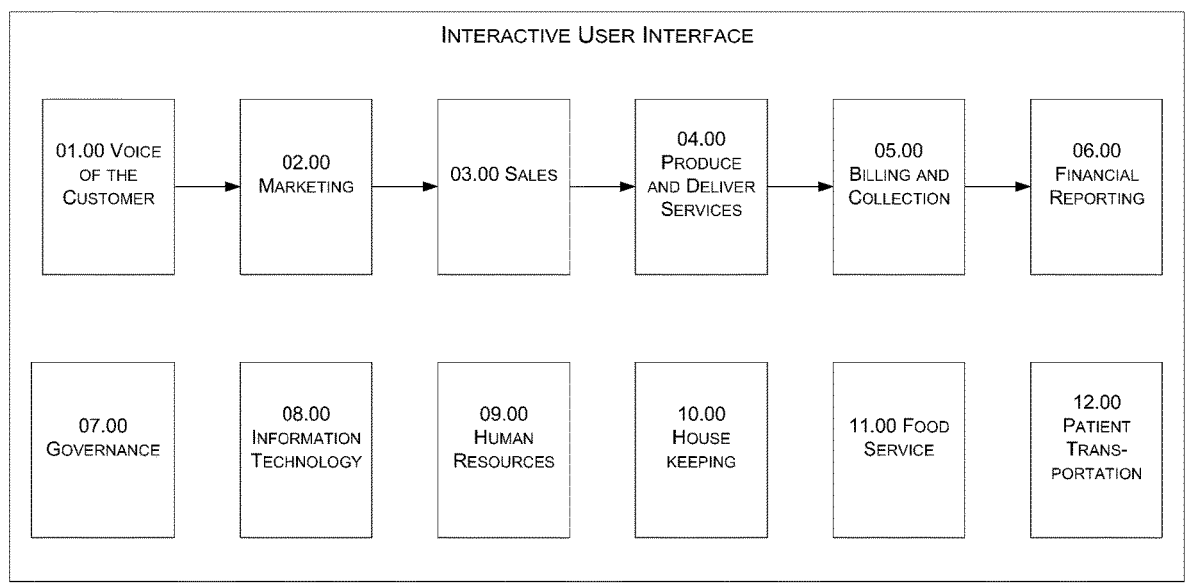
FIG. 5 lays out an example IEE value chain for monitoring the performance of a hospital in accordance with an embodiment of the present disclosure.

FIG. 5 lays out an example IEE value chain for monitoring the performance of a hospital in accordance with an embodiment of the present disclosure. As shown in FIG. 5, metrics for measuring the performance of a hospital may include metrics related voice of the customer, marketing, sales, produce and deliver services, billing & collection, financial reporting, governance, information technology, human resources, housekeeping, food service, and patient transportation. As one may appreciate, these metrics may differ depending on the type of organization and their objectives. Some of these metrics may be critical, and some may be good to have. Any deviation in the critical metrics needs to be immediately reported, and corrective actions may be required on a priority basis. Through an interactive user interface, each parameter and associated metrics can be explored. Departmental parameters, related metrics, and tracked data may be hyperlinked and can be retrieved by authorized users.

Figure 6:
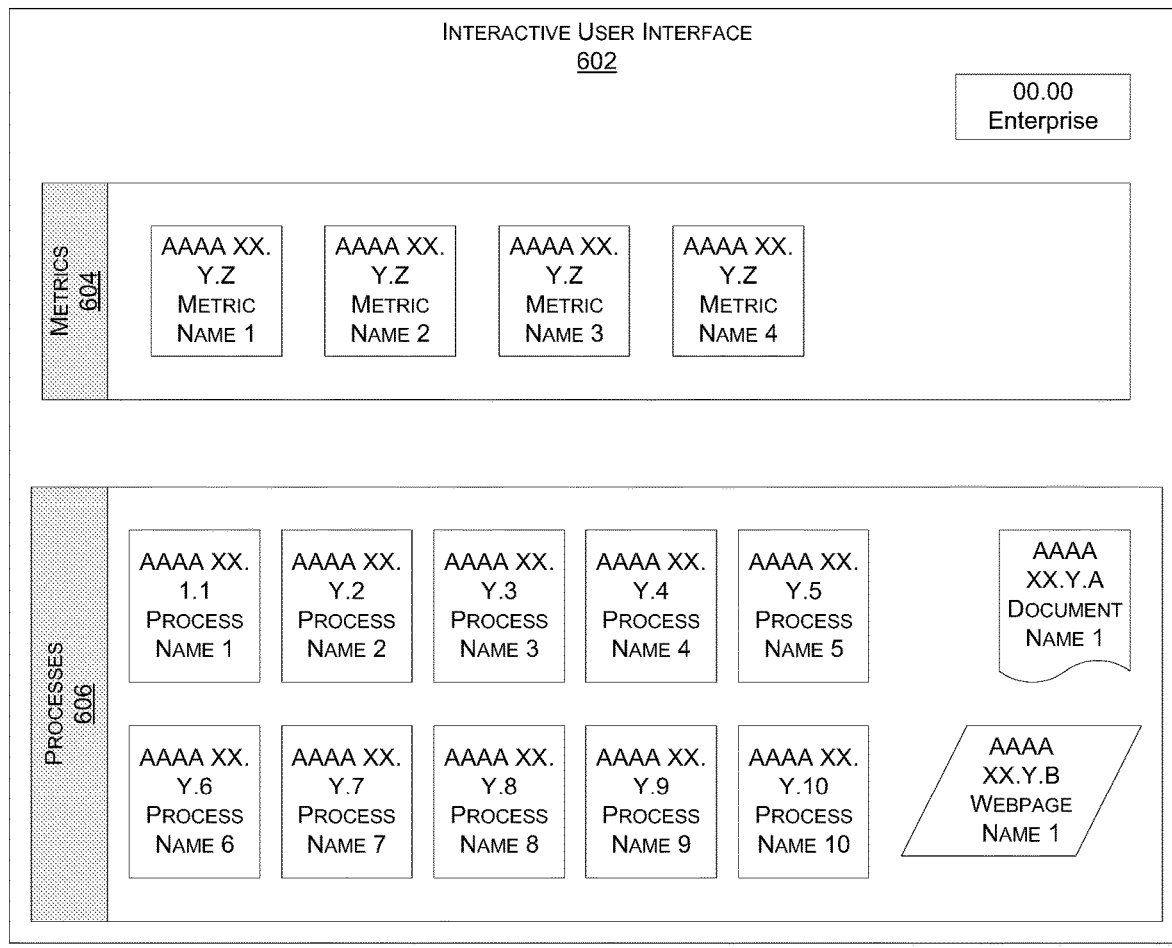
FIG. 6 provides an example IEE value chain dashboard illustrated a user interface through which a user can monitor the performance of an enterprise in accordance with an embodiment of the present disclosure.

FIG. 6 provides an example IEE value chain dashboard illustrated a user interface through which a user can monitor the performance of an enterprise in accordance with an embodiment of the present disclosure. For each departmental parameter, as shown in FIG. 5, the system allows users to browse the list of measurable metrics 604 and the processes 606 defined to achieve objective/goal associated with the departmental parameter. Relevant documents, metrics, processes, and associated data can be accessed through a single user interface 602. A process output response (Y) is a function of its process procedures and supplier inputs (Xs), which can be expressed mathematically as $Y=f(X)$. Traditionally in companies, the function that is responsible for organizational metric reporting is figuratively in the north wing of the building, and those responsible for process documentation and improvement are in the south wing of the building, and these two functions do not talk to each other. This disconnect can lead to very bad organizational behaviors where the north wing of the building is "doing what it takes" to meet upper-level organizational management goals that are more often than not arbitrarily set without often changing the process input Xs in order to make the process output response better relative to the goal. For example, to meet monthly shipment goals, a manufacturing organization may talk to customers asking them if they can ship their order early in order to meet a monthly goal, which can result in great expense to the organization as a whole through expediting work, offering discounts, etc. The IEE value chain structurally overcomes this so-called north-wing and south-wing disconnect by bringing a processes' Y reporting close to the X's that created it. Everyone in the organization should understand that to improve long-lasting Y improvement, a processes' associated Xs need improvement. FIG. 6 is a conceptual drill down of any of the functions noted in FIG. 5. E.g., 04.00 produce and deliver services. Where with EPRS software, this drill-down would be through a simple "click of the mouse" on any computer or smartphone by anyone in an organization who has authorization and access to the server that contains the information. Interface 602 may provide a hyperlink to documents and websites to get additional process execution information.

Users can return to get the complete view of the IEE value chain (same as the list of departmental parameters), as shown in FIG. 5. Users may move to different IEE value chain hierarchy and browse associated processes, metrics, and collected data.

Figure 7:
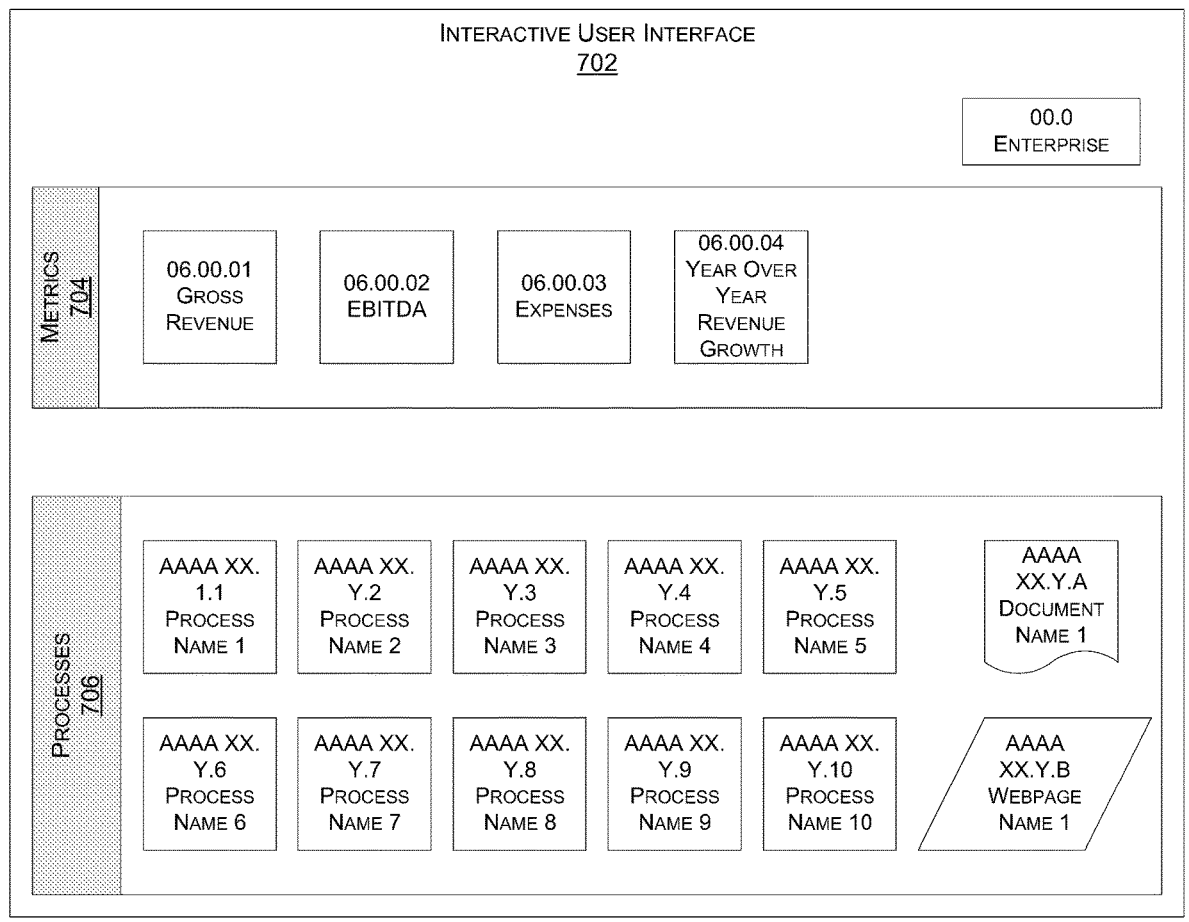
FIG. 7 shows an example of financial reporting in accordance with an embodiment of the present disclosure.

FIG. 7 shows an example of financial reporting in accordance with an embodiment of the present disclosure. Users may browse financial performance against overall process-improvement goals (e.g., amount mean monthly EBITDA is to increase), metrics 704, and processes 706 through single same user interface 702 (same as interface 602). As one may appreciate, the "mouse clicked" drill down of the 06.00 Financial reporting function shown in FIG. 5.

FIG. 8 illustrates an example enterprise improvement plan (EIP) report in accordance with an embodiment of the present disclosure. The system may present the EIP report that present through a single dashboard or reports links between business goal 802, improvement strategy 804 defined to achieve the business goals 802, high-level operational areas 806, potential improvement 808 projects related to each operational area, and project and improvement effort 810 defined/proposed. As one appreciates, often, companies process improvement efforts are chosen from a list of "brainstormed-potential-process-improvement efforts." With this traditional approach, there is often no structure alignment of the process improvement effort to how the process improvement work will benefit the financials of the enterprise as a whole. Traditional process improvement efforts are in silos relative to the big picture, and the $Y=f(X)$ relationship discussed previously is missing. An EIP overcomes this traditional process improvement effort shortcoming. In FIG. 8, the columns relate to the "boxes" shown in FIG. 4A. In FIG. 8, column 802 relates to the execution of the box numbered 408 in FIG. 4. In FIG. 8, column 804 relates the execution of box numbered 410 in FIG. 4A. In FIG. 8, columns 806 and 808 relates to the execution of box numbered 412 in FIG. 4. In FIG. 8, column number 810 relates to the execution of box number 414 in FIG. 4A. It is important to note that with this EIP illustration, important Xs of the organization as a whole (column on the right) is to be worked on to enhance the Y of the organization as a whole; i.e., its mean-monthly reported financials metric (column on the left)

Figure 9:
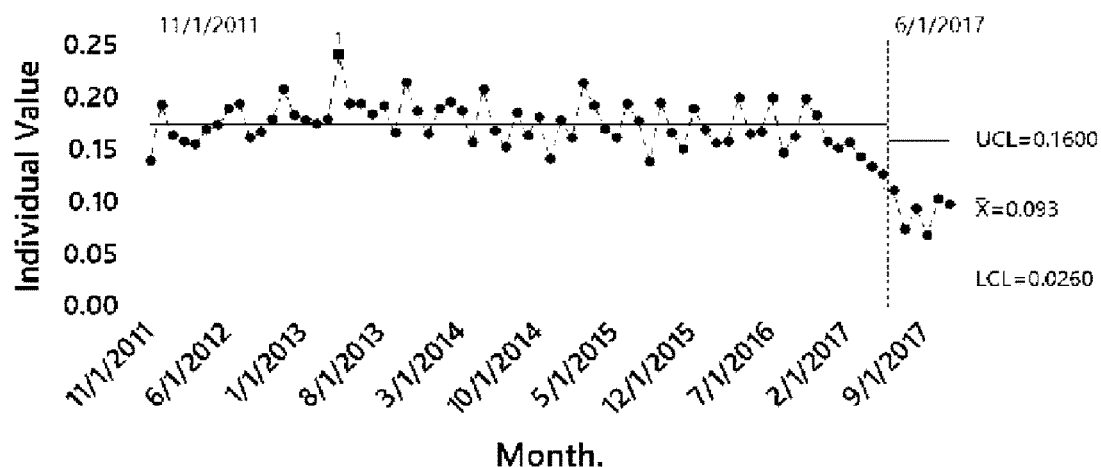
FIG. 9 delineates an example impact of an improvement measurement plan recommended in accordance with an embodiment of the present disclosure.

FIG. 9 delineates an example impact of an improvement measurement plan recommended in accordance with an embodiment of the present disclosure. Shown in this illustration is the execution of an IEE Lean Six Sigma Define-Measure-Analyze-Improve-Control (DMAIC) roadmap to improve an attribute pass/fail response in an organization (e.g., defective rate. However, in an IEE approach, the process improvement methodology does not matter. What is important is that the performance metric improved. The improvement metric identified in an EIP is going to be critical from an overall organization's point of view, then the organization's financials will benefit. In shown is the demonstration, an apparent process metric improvement need pulling for the creation of a DMAIC project and then the demonstration of the metric transitioning to an enhanced level of performance because of the project's execution.

Figure 10:
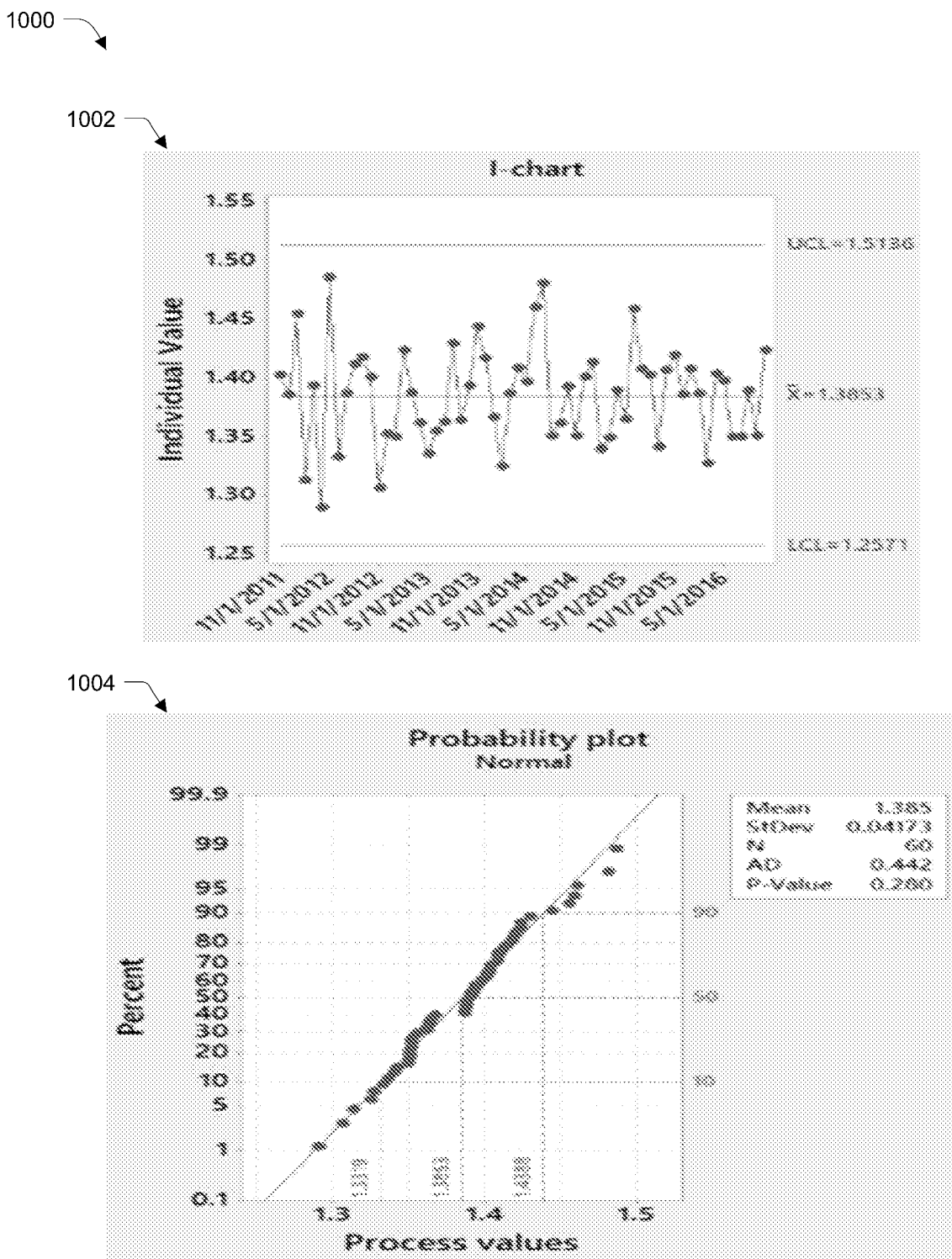
FIG. 10 shows two traditional graphical reporting tools that are used in this system to provide beneficial process-output metric information.

FIG. 10 shows two traditional graphical reporting tools that are used in this system to provide beneficial process-output metric information. In an embodiment, when the response is continuous data, e.g., monthly profit or number of manufactured shipped weekly, the graphical reporting, as shown in chart 1002 and chart 1004, would be useful. Chart 1002 uses the mathematics of an individuals control chart to assess process stability, where the sampling period is infrequent relative to typical statistical process control (SPC) practices. The individual chart is used since, from a high-level metric perspective, it is important to consider the variability between adjacent time intervals as a potential source of common-cause (typical process noise) variability. Traditional control charts, such as x-bar and r charts, p-charts, and c-charts, do not do a mathematical calculation of UCL and LCL (upper and lower control chart limits). Chart 1004 is a probability plot, which can be normal or another distribution (e.g., log-normal). For a continuous-output response, raw data from a process output response recent region of stability (in this case, all the data) is used to create this probability plot. When a process is considered stable from the individual chart, the probability plot can be used to create a predictive statement. If the process output response has a specification, then a statistically-determined predictive estimated rate of non-conformance beyond the specification limits will be provided. If there is no specification for a process output response, a mean or median response and 80% frequency of occurrence will be determined.

In FIG. 10, there was no specification; hence, a mean of 13853 was determined with an 80% frequency of occurrence between 13319 and 14388. It is important to note that organizations should not react in the individual control chart to all the ups and downs of the data as though they were the special cause—they are the common cause (noise) from the process-output overall response. The reaction, as shown in charts, which often occurs with traditional organizational scorecards, can lead to much organizational firefighting. If the process is stable and the futuristic expectations from the probability plot are not desirable, then this metric improvement need "pulls" for the creation of a process improvement project.

Figure 11:
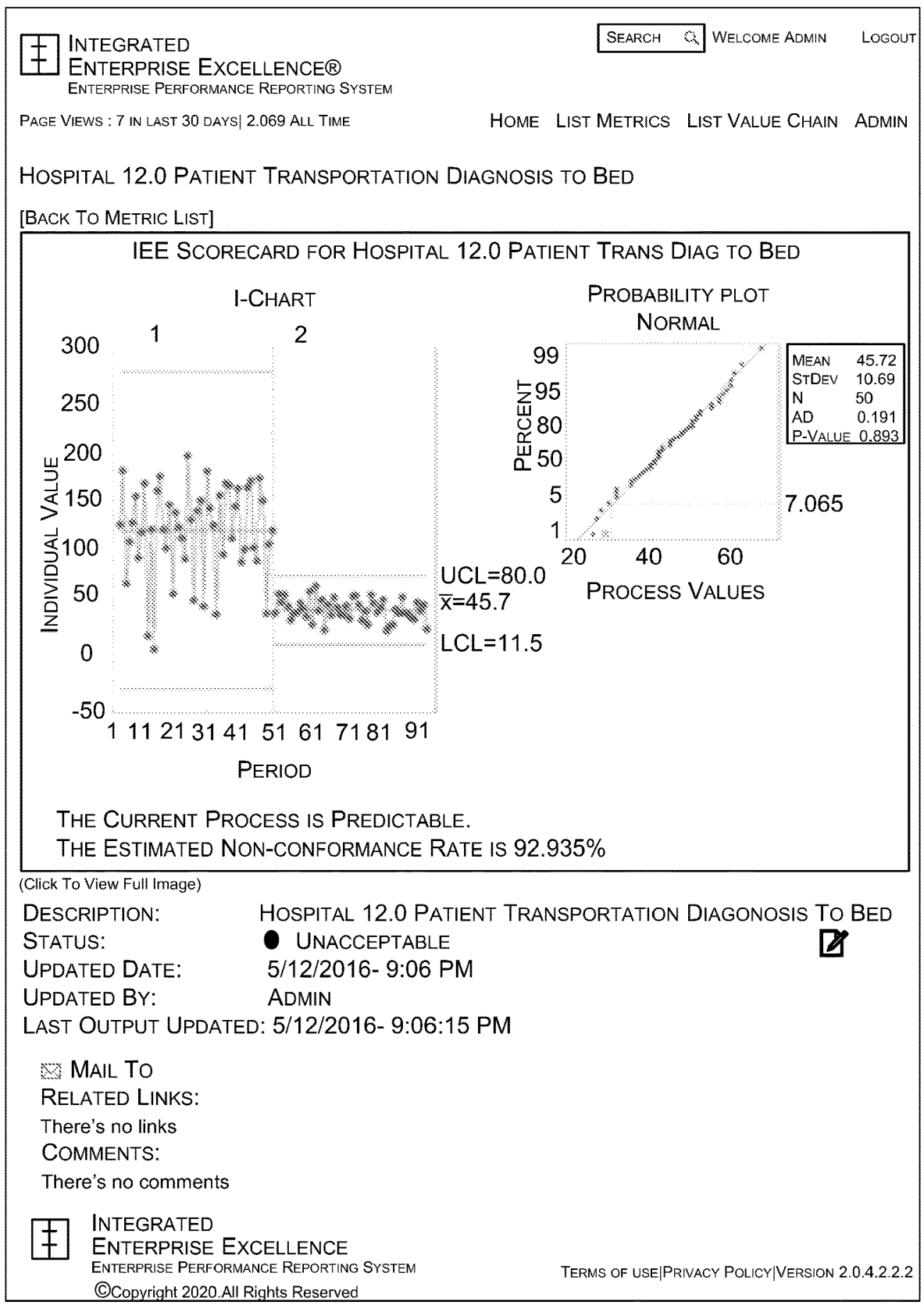
FIG. 11 illustrates an application of an individual chart shown in FIG. 10 with the probability plot, also shown in FIG. 10.

The left time-series plot in FIG. 11 shows how process stability is assessed with an infrequent subgrouping and time-series sampling (e.g., day, week, month, or lot number) individuals chart. Data from the recent region of stability (i.e., after the process response staging in this chart) is considered a random sample of the future to create the probability plot on the right side of the chart, which includes a statistically determined best fit line. Note, this probability plot may be a normal probability plot but could be a non-normal probability plot if that offers a better fit to the data, such as a log normal probability plot, which is often appropriate when there is a natural boundary in the data; e.g., lead time which cannot be below zero. From this best-fit line, a prediction statement is determined and reported at the bottom of the chart for a statistically-determined stable process. If there is a specification for the process, then an estimated percent or proportion non-conformance rate beyond the specification limits is stated at the bottom of the chart. If the process has no specification and is considered stable, an estimated median or means response statement will be stated with an expected 80% frequency of occurrence rate for individual measurement response in the future. If the process is not stable, a statement will be reported that the process is not predictable. This non-predictive statement can be overridden by a user of the software to provide a prediction statement if user believes a special-cause signal occurred by chance. With this methodology, all this chart generation is updated automatically (e.g., daily) for all metrics throughout an organization's IEE value chain so well informed data-based decisions can be made in a timely fashion, and there is transparency in what is happening relative to performance measurements and executing of established processes throughout an organization, 24×7. The charting of the output of a process relative to assessing process stability and providing a statistical process capability assessment and statement of performance in one chart where the chart is automatically updated (e.g., daily) is unique with this methodology.

The proposed method provides organization metrics that are reported from a high-level process output-response perspective, which includes the variability of the process and separates typically process output-response "noise" from unusual events or process-output response-trends. In FIG. 11, the individual's chart on the left side of the FIGURE shows the up and down movement of measurements that are within the statistically calculated UCL and LCL horizontal lines for an individual chart. When datum points are within these UCL and LCL lines, the up and down variations are considered common-cause output noise from the process. As one should appreciate, this individuals chart is not a traditional control chart usage, which is to control a process at a "low" level. Data in IEE high-level charting is taken infrequently (e.g., daily or by a lot of received material). Hence, this chart provides a high-level view of the output of a process. This metric reporting methodology can get organizations out of the firefighting mode where common-place red-yellow-green reporting often reacts to common-cause variability as though it were a special cause (e.g., when a red-yellow-green goal is within the UCL and LCL limits).

Using the proposed method, the reporting of organizational Key Performance Indicators (KPIs) or other metrics can provide a predictive statement of what can be expected in the future for a process's output response when the metric is determined to be statistically stable from a high-level process-output perspective. If a reported predictive statement is undesirable, then this metric improvement need "pulls" for the creation and execution of process improvement work. When statistically-determined measurement improvement has occurred (e.g., from process improvement work), the high-level individuals chart in the reporting transitions to an enhanced level of performance (called staging of the individual chart). A new, enhanced level of performance is then reported automatically when the process is determined to be statistically stable.

FIG. 11 illustrates an application of an individual chart shown in FIG. 10 with the probability plot, also shown in FIG. 10. For this reporting, the individual chart indicates process stability (no datum values beyond the Upper and Lower statistically calculated control limits—UCL and LCL—after period 51 on the individuals chart in FIG. 11), and the normal probability plot provides a predictive estimation of what can be expected given an upper specification of 30 minutes for transporting a patient. As shown in FIG. 11, a statement at the bottom of the chart provides a predictive statement that 92% percent of patients are not expected to be delivered in less than 30 minutes, even after there was a significant change to the better earlier indicated by the staging of the individual chart. Additional process improvements are needed to achieve a 30 minute or less patient delivery time if this requirement is still considered important to an organization's overall EIP effort. One appreciates how this chart has a red designation (i.e., round circle dark color in FIG. 11 with word "unacceptable" next to the circle). The red color (in a non-black-and-white print-out) is a signal that additional overall process improvement is needed. This color action is NOT like a red signal in a red-yellow-green scorecard, which indicates an individual measurement is not meeting a criterion (a policy for score carding that can lead to much firefighting common-cause noise as though it were the special cause). Someone who notes that this IEE metric-report chart needs attention can quickly send an e-mail to the responsible party with their observed comments. All the above dialog is in accordance with an embodiment of the present disclosure.

Figure 12:
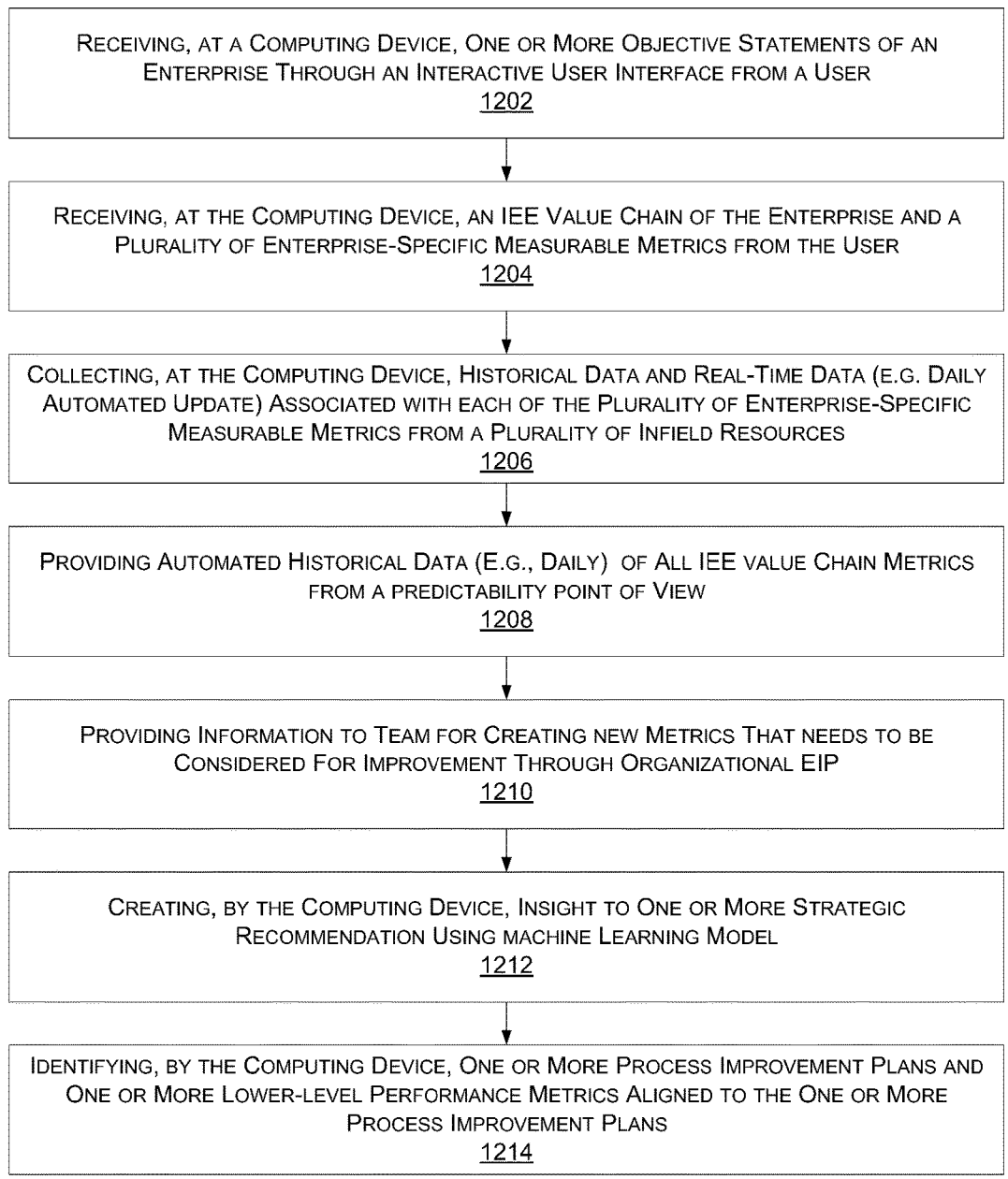
FIG. 12 is a flow diagram illustrating performance measurement in accordance with an embodiment of the present disclosure.

FIG. 12 is a flow diagram illustrating performance measurement in accordance with an embodiment of the present disclosure. The method includes steps of receiving, at a computing device, one or more objective statements of an enterprise through an interactive user interface from a user as shown at block 1202, receiving, at the computing device, an IEE value chain of the enterprise and a plurality of enterprise-specific measurable metrics for the user, as shown at block 1204, and collecting historical data and real-time data (e.g., daily) associated with each of the plurality of enterprise-specific measurable metrics from a plurality of infield resources through a communication network as shown at block 1206. The method further includes the step of providing automatic historical data assessment (e.g., daily) of all IEE value chain metrics from a predictability point of view, as shown in block 1208. An analysis of the historical data and the real-time data using a statistical model is performed to assess whether a process output response is predictable. The method provides a predictive statement for all processes that are considered stable. From this IEE value chain reporting, organizations can assess whether something needs to be done to resolve a special cause event, evaluate the metric response for a currently undertaken process improvement project, or undertake a new process improvement project to improve a metric response within the organization's EIP. The method further includes steps of providing required information to the team that can determine what new metric needs to be considered for improvement through organizational EIP, as shown at block 1210 and created by the computing device insight to one or more strategic recommendations that can be overcome through process improvement efforts using a machine learning model as shown at step 1212. The method includes steps of identifying, by the computing device reporting and team analyses, one or more process improvement plans and one or more lower-level performance metrics, which are added to the organization's EIP effort that benefits the organization's overall financials as shown at block 1214.

Figure 13:
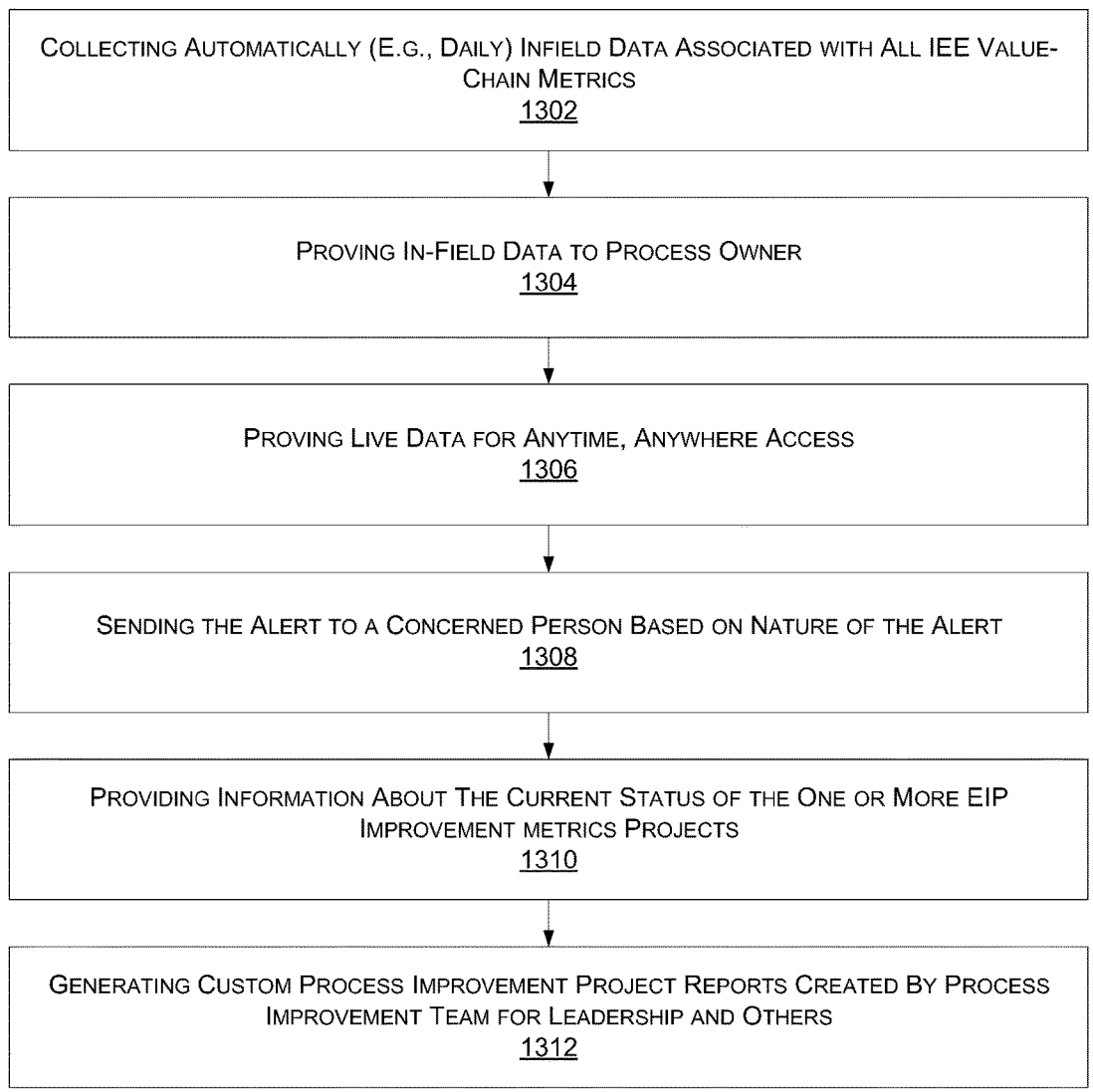
FIG. 13 is a flow diagram illustrating performance monitoring and reporting in accordance with an embodiment of the present disclosure.

FIG. 13 is a flow diagram illustrating performance monitoring and reporting in accordance with an embodiment of the present disclosure. The process for performance monitoring and reposting includes steps of collecting automatically (e.g., daily) infield data associated with all IEE value-chain metrics at all organizational levels, as shown at steps 1302. The infield data is collected from different departments. For example, in a typical enterprise environment, data from all primary functions such as sales, marketing, operations, and VOC along with support functions such as IT, HR, maintenance, safety) are collected. The metrics for each IEE value chain function can be determined by a team and management when setting up the IEE value chain. Focus is given at this time to have metrics that addressed the functional delivery of quality, cost, and time (which includes functional efficiencies and effectiveness of delivery of their function's deliverables). Process 1300 includes the step of providing infield data to process owners, as shown at block 1304, to enable them to assess how their process-output metrics are performing relative to the needs of the business and any identified EIP process improvement efforts. Any other authorized person in the organization can also view 24×7 all organizational process metric responses. The process further includes the step of providing access to information to everyone in the organization (from operations personnel to CEO) to examine all process-output metrics (and their associated processes) 24 hours per day, 7 days each week, as shown in block 1306. This form of reporting provides complete reporting transparency; i.e., is there will be no fear of "shooting the messenger" when someone feels that bad news should be reported up the organizational chart (with a traditional leadership metric reporting approach). The charting will provide a visual for the identification of special-cause events that should have a timely resolution (which a process owner should have someone timely undertake). However, perhaps the most value of the charting is the quantification and expectation for what can be expected in the future if nothing were to change. If an output response is stable, it is considered predictable. If the futuristic statement is undesirable, this metric improvement need pulls for the creation of a process improvement project. The process further includes the step of sending an alert to a process owner or concern person (e.g., manager or leadership) based on the nature of the alert, as shown in block 1308. This level of transparency could have avoided the BP oil spill and Blue Bell *Listeria* deaths, as operational personnel would have got to know that they had a problem that needed resolving. As the issue did not get passed upward in a timely manner, the issues were not resolved before bad things occurred.

The process further includes the step of providing information about the current status of one or more EIP improvement metric projects to the process owner, as shown at block 1310, so that a process owner can do what it takes to remove any barriers that a team's process improvement efforts are encountering relatively to the execution of work (including replacing members of the process improvement team if necessary). The process improvement work is important to the process owner since he or she will be reporting the status of their metric's performance improvement expectation and related process improvement work to their leadership on a monthly or quarterly basis. As one may appreciate, the proposed process is very different from a traditional Lean Six Sigma improvement project that does not have an alignment of its process-metric response to the overall business reported metrics identified in an EIP.

Figure 14:
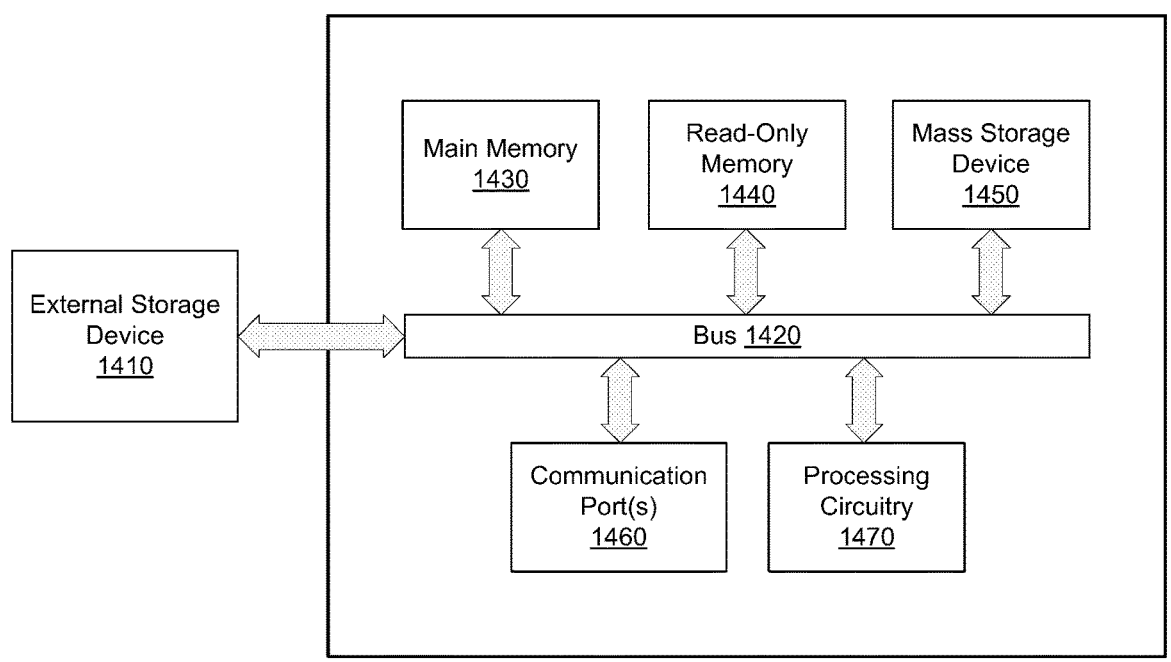
FIG. 14 exhibits an exemplary computer system in which or with which embodiments of the present invention may be utilized.

The process also includes the step of generating custom process-improvement project reports (as shown in FIG. 14) created by the process improvement team for leadership and others, as shown in block 1312, which are stored in the EPRS software for all authorized to see 24×7. Also, presentations to management and others can make access to a "mouse clickable" access in the IEE value chain to provide up-to-date metrics (and process information) that are mentioned and highlighted in a presentation. This will save much time and resources creating special executive and other leadership reports where the reported metrics are static and will be "dated" (not up-to-date information) at the time the presentation occurs.

FIG. 14 illustrates an exemplary computer system in which or with which embodiments of the present invention may be utilized. Depending upon the particular implementation, the various process and decision blocks described above may be performed by hardware components, embodied in machine-executable instructions, which may be used to cause a general-purpose or special-purpose processor programmed with the instructions to perform the steps, or the steps may be performed by a combination of hardware, software, firmware and/or involvement of human participation/interaction. As shown in FIG. 14, the computer system includes an external storage device 1410, a bus 1420, a main memory 1430, a read-only memory 1440, a mass storage device 1450, a communication port 1460, and a processor 1470.

Those skilled in the art will appreciate that computer system 1400 may include more than one processing circuitry 1470 and communication ports 1460. The processing circuitry 1470 should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quadcore, Hexa-core, or any suitable number of cores) or supercomputer. In some embodiments, processing circuitry 1470 is distributed across multiple separate processors or processing units, for example, multiple of the same type of processing units (e.g., two Intel Core i7 processors) or multiple different processors (e.g., an Intel Core i5 processor and an Intel Core i7 processor). Examples of processing circuitry 1470 include, but are not limited to, an Intel® Itanium® or Itanium 2 processor(s), or AMD® Opteron® or Athlon MP® processor(s), Motorola® lines of processors, System on Chip (SoC) processors or other future processors. Processing circuitry 1470 may include various modules associated with embodiments of the present invention.

Communication port 1460 may include a cable modem, Integrated Services Digital Network (ISDN) modem, a digital subscriber line (DSL) modem, a telephone modem, an Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of electronic devices or communication of electronic devices in locations remote from each other. The communication port 1460 can be any of an RS-232 port for use with a modem-based dialup connection, a 10/100 Ethernet port, a Gigabit or 10 Gigabit port using copper or fiber, a serial port, a parallel port, or other existing or future ports. Communication port 1460 may be chosen depending on a network, such as a Local Area Network (LAN), Wide Area Network (WAN), or any network to which the computer system connects.

Memory 1430 may include Random Access Memory (RAM or any other dynamic storage device commonly known in the art. Read-only memory 1440 can be any static storage device(s), e.g., but not limited to, a Programmable Read-Only Memory (PROM) chips for storing static information, e.g., start-up or BIOS instructions for processing circuitry 1470.

Mass storage 1450 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) 10 recorders, BLU-RAY 3D disc recorders, digital video recorders (DVRs, sometimes called a personal video recorder or PVRs), solid-state devices, quantum storage devices, gaming consoles, gaming media, or any other suitable fixed or removable storage devices, and/or any combination of the same. Nonvolatile memory may also be used (e.g., to launch a boot-up routine and other instructions). Cloud-based storage may be used to supplement storage memory 1430. Memory 1450 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firmware interfaces), e.g., those available from Seagate (e.g., the Seagate Barracuda 7200 family) or Hitachi (e.g., the Hitachi Deskstar 7K1000), one or more optical discs, Redundant Array of Independent Disks (RAID) storage, e.g., an array of disks (e.g., SATA arrays), available from various vendors including Dot Hill Systems Corp., LaCie, Nexsan Technologies, Inc. and Enhance Technology, Inc.

Bus 1420 communicatively couples processor(s) 1470 with the other memory, storage, and communication blocks. Bus 1420 can be, e.g., a Peripheral Component Interconnect (PCI)/PCI Extended (PCI-X) bus, Small Computer System Interface (SCSI), USB, or the like, for connecting expansion cards, drives, and other subsystems as well as other buses, such a front side bus (FSB), which connects processor 1470 to a software system.

Optionally, operator and administrative interfaces, e.g., a display, keyboard, and a cursor control device, may also be coupled to bus 1420 to support direct operator interaction with the computer system. Other operator and administrative interfaces can be provided through network connections connected through communication port 1460. An external storage device 1410 can be any kind of external hard-drives, floppy drives, IOMEGA® Zip Drives, Compact Disc-Read-Only Memory (CD-ROM), Compact Disc-Re-Writable (CD-RW), Digital Video Disk-Read Only Memory (DVD-ROM). The components described above are meant only to exemplify various possibilities. In no way should the aforementioned exemplary computer system limit the scope of the present disclosure.

The computer system 1400 may be accessed through a user interface. The user interface application may be implemented using any suitable architecture. For example, it may be a stand-alone application wholly implemented on the computer system 1400. The user interfaces application and/or any instructions for performing any of the embodiments discussed herein may be encoded on computer-readable media. Computer-readable media includes any media capable of storing data. In some embodiments, the user interface application is a client server-based application. Data for use by a thick or thin client implemented on an electronic device computer system 1400 is retrieved on-demand by issuing requests to a server remote to the computer system 1400. For example, computer device 1400 may receive inputs from the user via an input interface and transmit those inputs to the remote server for processing and generating the corresponding outputs. The generated output is then transmitted to the computer device 1400 for presentation to the user.

While embodiments of the present invention have been illustrated and described, it will be clear that the invention is not limited to these embodiments only. Numerous modifications, changes, variations, substitutions, and equivalents, will be apparent to those skilled in the art without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular name.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document, terms "coupled to" and "coupled with" are also used euphemistically to mean "communicatively coupled with" over a network, where two or more devices can exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions, or examples, which are included to enable a person having ordinary skill in the art to make and use the invention when combined with information and knowledge available to the person having ordinary skill in the art.

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter outlined in the claims is not intended to be limited to the embodiments shown herein but is to be accorded to the widest scope consistent with the principles and novel features disclosed herein. It is contemplated that additional embodiments are within the spirit and true scope of the disclosed subject matter.

REFERENCES

1. Axelrod, J and Rand E. (2015), "How investigators cracked the Blue Bell *Listeria* outbreak case," CBS News, http://www.cbsnews.com/news/how-investigators-cracked-blue-bell-listeria-outbreak-case/.
2. Bloomberg (2019), "Charting GE's Historic Rise and Tortured Downfall," http://www.bloomberg.com/graphics/2019-general-electric-rise-rise-downfall/.
3. Broder, J. (2011), "BP Shortcuts Led to Gulf Oil Spill, Report Says," The New York Times, http://www.nytimes.com/2011/09/15/science/earth/15spill.html.
4. Colvin, G. and Wahba, P. (2019), "Sears' Seven Decades of Self-Destruction," Fortune, https://fortune.com/longform/sears-self-destruction/.
5. Egan, M. (2015), "Kmart's sales have fallen off a gigantic cliff," CNN Business, http://www.money.cnn.com/2015/06/08/investing/kmart-sales-decline-sears-eddie-lampert/.
6. Galuszka, P (2008), "Eight Reasons Why Circuit City Went Bankrupt," CBS News, http://www.cbsnews.com/news/eight-reasons-why-circuit-city-went-bankrupt/.
7. Hess, E. (2010), "Stark Lessons From The Dell Fraud Case," Forbes, http://www.forbes.com/2010/10/13/michael-dell-fraud-leadership-governance-sec.html#48d2a97c6d6a.
8. Sullivan, J. (2017), "Ouch, 50% of New Hires Fail! 6 Ugly Numbers Revealing Recruiting's Dirty Little Secret," http://www.ere.net/ouch-50-of-new-hires-fail-6-ugly-numbers-revealing-recruitings-dirty-little-secret/.
9. Wiersema, M. (2002), "Holes at the Top: Why CEO Firings Backfire," Harvard Business Review, https://hbr.org/2002/12/holes-at-the-top-why-ceo-firings-backfire.

10. Wolff-Mann, E., (2019), "Wells Fargo scandals: The complete list," Yahoo Finance, http://finance.yahoo.com/new/wells-fargo-scandals-the-complete-timeline-141213414.html.

We claim:

1. A system for business management with an integrated nine-step business management model, the system comprising:

processor(s);

interface(s);

a memory communicatively coupled to the processor(s), wherein the memory stores processor-executable instructions, which, on execution, cause the processor(s) to perform business management using modules in the system, the modules comprising;

an enterprise statement receiving module configured to receive, at a computing device, one or more objective statements comprising mission statements and vision statements of an enterprise through an interactive user interface from a user;

an Integrated Enterprise Excellence (IEE) value chain and measurable metrics receiving module configured, at the computing device, to receive an IEE value chain of the enterprise and a plurality of enterprise-specific measurable metrics from the user;

one page showing metrics and processes that created the metrics; and each of the metrics and the processes being further clickable to access: a reporting module, a process improvement identification module, an impact assessment module, a control module, and a control mechanism, wherein the clickable one page is accessible by all members of the enterprise through a plurality of user devices;

a current state analysis module configured, at the computing device, to:

collect historical data and real-time data associated with each of the plurality of enterprise-specific measurable metrics from a plurality of infield resources through a communication network; and analyze the historical data and the real-time data using a statistical model to determine if each of the plurality of enterprise-specific measurable metrics are predictive or a special-cause event(s) has occurred, which may need timely resolution, along with strengths and shortcomings of the enterprise;

an execution monitoring module configured to automatically assess process responses of each of the plurality of enterprise-specific measurable metrics in the IEE value chain to be one of stable and unstable, based on the analysis by the statistical model, wherein when respective process response of one or more metrics from the plurality of enterprise-specific measurable metrics is stable, the execution monitoring module configured to provide a prediction statement for each of the one or more metrics;

the reporting module configured to output, through an active dashboard, a process-output response reporting in form of real-time time-series high-level performance reported data comprising status of defined processes through the IEE value chain based on analysis by the statistical model, wherein the active dashboard presents a metric-report-out chart with the prediction statement, or with an alert for the special-cause event(s), wherein the process-output response is a function of process procedures and supplier inputs and includes variability of process and separates typical process output-response noise from unusual events or process-output response-trends;

the process improvement identification module configured to identify one or more process improvement plans and one or more lower-level performance metrics aligned to the one or more process improvement plans, based on the analysis of the historical data and the real-time time-series high-level performance reported data;

the impact assessment module configured to assess completion of the one or more EIP process improvement plans and impact of the one or more EIP process improvement plans on enterprise goals;

the control module configured to facilitate tracking and maintenance of gain, related to the enterprise, through the one or more process improvement plans, for positive results from the one or more process improvement plans, wherein when a degradation is detected in the process responses, the system is configured to repeat the steps of collecting historical data and real-time data, automatically assess process responses, reporting, identifying one or more process improvement plans, assessing completion and impact of the one or more EIP process improvement plans until the gain is maintained; and the control mechanism to maintain the gain from improvement plans.

2. A system of claim 1, wherein the reporting of data associated with the plurality of enterprise-specific measurable metrics, comprising of enterprise Key Performance Indicators (KPIs) or other metrics, provides the predictive statement of what is expected in the future for a process's output, when the process response is considered stable from a high-level perspective.

3. The system of claim 1, wherein the reporting module provides a risk assessment and avoidance measurement tracking and automatic reporting when a Key Performance Indices (KPI) metric of the plurality of enterprise-specific measurable metrics has transitioned statistically to a worse condition or when a special-cause event is detected.

4. The system of claim 1, wherein each of the plurality of enterprise-specific measurable metrics is linked to the processes that created them throughout an IEE value chain.

5. The system of claim 1 further comprising an overall enterprise-IEE-reported-financial-goal-setting module configured to facilitate one or more stake-holders to create targeted strategic operational organizational goals for IEE reported metrics that lead to process improvements so the big-picture financials benefit.

6. The system of claim 1 further comprises:

the execution monitoring module configured to collect infield data associated with the one or more recommended metrics and the one or more lower-level metrics from the infield resources;

analyze the infield data to identify deviation from expected results;

generate in one chart an assessment report of process-output response stability, from a process-output response point of view with the incorporation of a predictive assessment and futuristic expectation for a stable process for all metrics throughout an organizational IEE value chain.

7. The system of claim 1 further comprises a strategy recommendation module configured, at the computing device, to provide information for the creation of one or more strategic recommendations to overcome the shortcoming of the enterprise using a machine learning model.

8. The system of claim 1, wherein the reporting module is configured to allow a remote user to monitor through an interactive user interface
- one or more functional aspects of the IEE value chain of the enterprise;
- one or more processes associated with an individual component of the IEE value chain;
- graphical statistical assessment of a process output response to determining process stability;
- graphical representation of the plurality of enterprise-specific measurable metrics that includes both an assessment of process stability and provides a predictive statement for a process output response in one chart;
- graphical statistic-based metric reporting that graphically shows when a process response has changed, perhaps for the betterment from a process-improvement project or degradation for whatever reason;
- graphical representation of data associated with the plurality of enterprise-specific measurable metrics;
- graphical representation of data associated with the one or more recommended measurable metrics;
- graphical representation of data associated with the one or more lower-level measurable metrics; and
- visual representation of the impact assessment.

9. The system of claim 1, wherein the reporting module is configured to generate custom reports for a plurality of effective management attributes, wherein the plurality of effective management attributes comprises executive performance management review, decision-making process, strategy formulation, scoreboard/dashboard reporting, and enterprise improvement efforts.

10. The system of claim 1, wherein the enterprise statement receiving module is configured to receive one or more objective statements of an enterprise comprises mission statement, visions statement, value statement, and response to Jim Collins' three-circle questions.

11. The system of claim 1, wherein the knowledge database maintains the repository of determining metrics that provide insight to each function's performance in an IEE value chain from a quality, cost, and time perspective, which includes efficiency and effectiveness.

12. The system of claim 1, wherein the plurality of enterprise-specific measurable metrics comprises high-level enterprise-specific measurable metrics and lower level enterprise-specific measurable metrics.

* * * * *